US012801125B2

(12) United States Patent
Maggiore et al.

(10) Patent No.: US 12,801,125 B2
(45) Date of Patent: Nov. 17, 2026

(54) METHOD FOR TRANSFERRING DIGITAL PROCEDURES WITHIN A CORPUS OF MANUFACTURING SITES

(71) Applicant: Apprentice FS, Inc., Jersey City, NJ (US)

(72) Inventors: Frank Maggiore, Jersey City, NJ (US); Angelo Stracquatanio, Jersey City, NJ (US); Emilee Cook, Jersey City, NJ (US); Adam Cormack, Jersey City, NJ (US); John Zimmerman, Jersey City, NJ (US); Adam Wisniewski, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 346 days.

(21) Appl. No.: 18/440,334

(22) Filed: Feb. 13, 2024

(65) Prior Publication Data

US 2024/0264586 A1 Aug. 8, 2024

Related U.S. Application Data

(63) Continuation-in-part of application No. 18/234,808, filed on Aug. 16, 2023, now Pat. No. 12,468,876.

(60) Provisional application No. 63/522,843, filed on Jun. 23, 2023, provisional application No. 63/522,840, filed on Jun. 23, 2023, provisional application No. 63/446,572, filed on Feb. 17, 2023, provisional application No. 63/445,228, filed on Feb. 13, 2023, provisional application No. 63/399,137, filed on Aug. 18, 2022.

(51) Int. Cl.
*G05B 19/418* (2006.01)

(52) U.S. Cl.
CPC ... *G05B 19/41865* (2013.01); *G05B 19/4184* (2013.01); *G05B 2219/32077* (2013.01)

(58) Field of Classification Search
CPC .......... G05B 19/41865; G05B 19/4184; G05B 2219/32077; G09B 19/003; G09B 19/24; G09B 5/065; H04L 67/12; H04W 4/029; G06F 3/167
USPC .......... 700/100
See application file for complete search history.

(56) References Cited

U.S. PATENT DOCUMENTS

2007/0061144 A1* 3/2007 Grichnik ................ G05B 17/02 704/256.8
2018/0017959 A1* 1/2018 Pandian ................ G06Q 10/06
2019/0316912 A1* 10/2019 Maggiore ................ G06F 9/453

* cited by examiner

*Primary Examiner* — Jigneshkumar C Patel
(74) *Attorney, Agent, or Firm* — Run8 Patent Group, LLC; Peter Miller

(57) ABSTRACT

A method for predicting batch yield includes: accessing a batch range specification defining a set of batch ranges for characterizing batch output upon completion of a performed instance of a verified digital procedure; and, in response initiating an instance of the verified digital procedure detecting a set of manufacturing inputs in the verified digital procedure and receiving a set of parameters corresponding to the set of manufacturing inputs from the operator. The method also includes: identifying a batch yield of the instance of the verified digital procedure as corresponding to a target batch range in the set of batch ranges; interpreting a process change resulting in the batch yield based on the set of parameters and a target set of parameters; isolating a parameter associated with the process change; and initializing a new digital procedure characterizing the process change based on the verified digital procedure and the first parameter.

20 Claims, 6 Drawing Sheets

METHOD FOR TRANSFERRING DIGITAL PROCEDURES WITHIN A CORPUS OF MANUFACTURING SITES

CROSS-REFERENCE TO RELATED APPLICATIONS

This Application claims the benefit to U.S. Provisional Application No. 63/446,572, filed on 17 Feb. 2023, and 63/445,228, filed on 13 Feb. 2023, 63/522,840, filed on 23 Jul. 2023, and 63/522,843, filed on 23 Jul. 2023, each of which is hereby incorporated in its entirety by this reference.

This Application is a continuation-in-part of U.S. Non-Provisional application Ser. No. 18/234,808, filed on 16 Aug. 2023, which claims the benefit to U.S. Provisional Application No. 63/399,137, filed on 18 Aug. 2022, each of which is hereby incorporated in its entirety by this reference.

This Application is related to U.S. Non-Provisional application Ser. No. 18/084,335, filed on 19 Dec. 2022, Ser. No. 17/968,684, filed on 18 Oct. 2022, Ser. No. 17/984,996, filed on 10 Nov. 2022, and Ser. No. 17/719,120, filed on 12 Apr. 2022, each of which is incorporated in its entirety by this reference.

TECHNICAL FIELD

This invention relates generally to the field of manufacturing and more specifically to a new and useful method for controlling dissemination of instructional content to operators performing procedures within a network of facilities in the field of manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method: Digital Procedure Transfer

Figure 1:
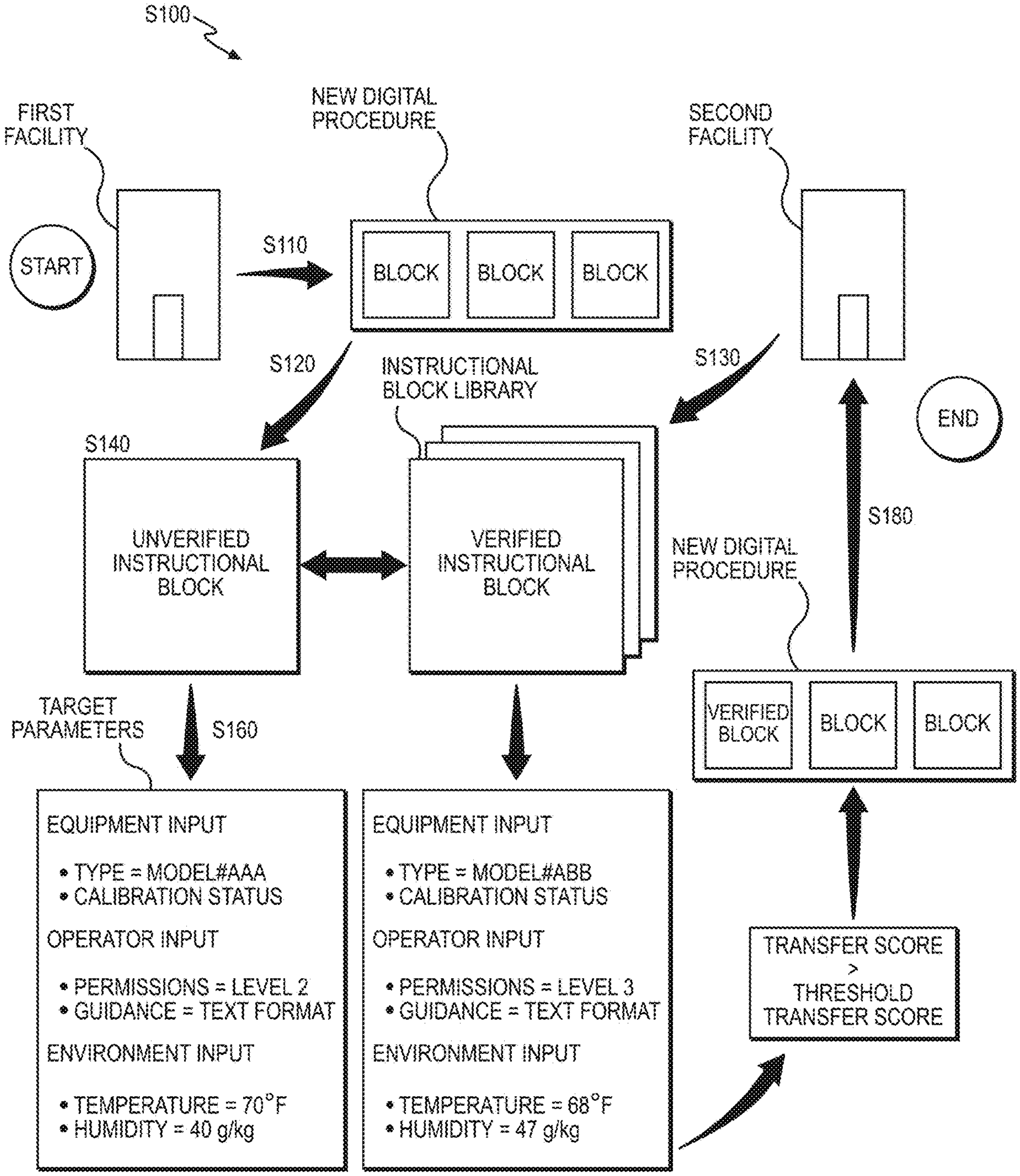
FIG. 1 is a flowchart representation of a first method.
Figure 2:
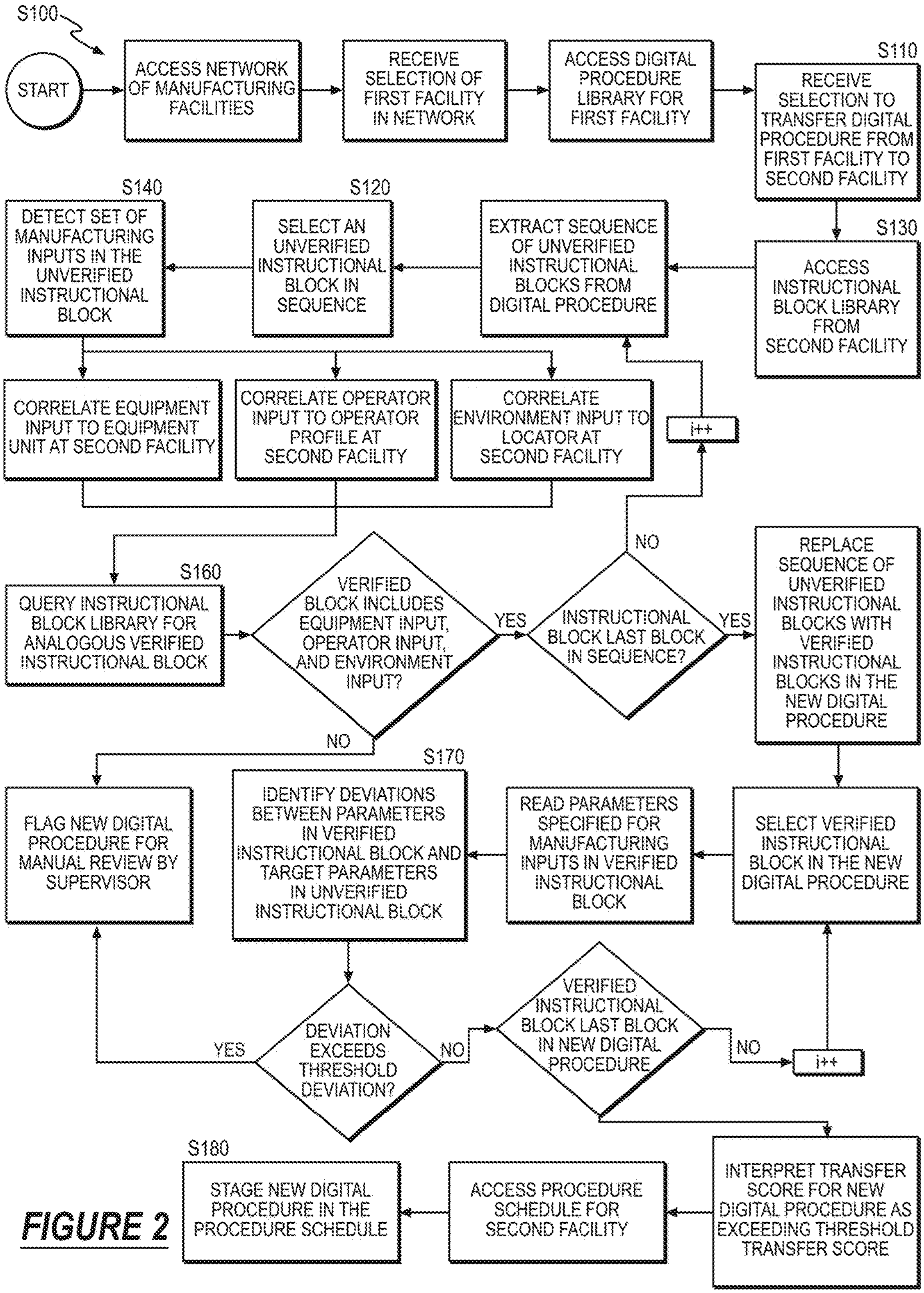
FIG. 2 is a flowchart representation of the first method.

As shown in FIG. 1, a method S100 for transferring digital procedures within a corpus of manufacturing sites includes: receiving a selection to transfer a new digital procedure to a first facility within the corpus of manufacturing sites in Block S110; in response to receiving the selection, accessing a first unverified instructional block in the new digital procedure for staging at the first facility in Block S120; and accessing an instructional block library containing a set of verified instructional blocks associated with approved digital procedures performed at the first facility in Block S130.

The method S100 further includes: detecting a first set of manufacturing inputs in the first unverified instructional block in Block S140; and identifying a first verified instructional block, in the set of verified instructional blocks contained in the instructional block library, as analogous to the first unverified instructional block in response to the first verified instructional block including the first set of manufacturing inputs in Block S160.

The method S100 also includes calculating a first transfer score for staging the new digital procedure at the first facility in Block S170 based on: a target set of parameters for the first set of manufacturing inputs in the first unverified instructional block; and a first set of parameters for the first set of manufacturing inputs in the first verified instructional block.

The method S100 further includes, in response to the first transfer score exceeding a threshold transfer score, inserting the first verified instructional block, in place of the first unverified instructional block, in the new digital procedure in Block S180.

1.2 Applications: Digital Procedure Transfer

Generally, a computer system (e.g., computer network) can execute Blocks of the method S100 to: generate an alternative digital procedure based on a new or existing digital procedure currently performed within a facility—within a network of facilities, from a scaled-up process from a Process Development or R&D site, or from an external facility—and defining processes for manufacturing materials (e.g., pharmacological materials) in the facility; derive a requirement category (e.g., batch output risk, facility transfer costs, new construction, time delays, operator risk for adopting a new process, or operating costs) for performing steps of the alternative digital procedure in a second facility within the network of facilities; tune, adjust, or flag steps in the alternative digital procedure based on risk category; and autonomously coordinate transfer of the alternative digital procedure to the second facility for execution.

In particular, in response to receiving selection from an operator to transfer a particular step of the digital procedure currently performed within a first facility to a second facility, the computer system can: extract a first set of manufacturing inputs (e.g., equipment units, operators, operator actions, environmental conditions, materials) for a particular step of the digital procedure currently being performed within a facility; identify a second set of manufacturing inputs—within a global set of manufacturing inputs for the second facility—analogous to the first set of manufacturing inputs at the first facility; and calculate a transfer score, such corresponding to risk, time, financial, or other scoring types for transferring this particular step to the second facility based on the parameters of the digital procedure and the differences of the first set of manufacturing inputs and the second set of manufacturing inputs.

The computer system can repeat this process for each step in the digital procedure currently performed at the first facility in order to: calculate a transfer score characterizing requirements (e.g., risk, time, financial) for transferring each step in the digital procedure to the second facility; and autonomously assign performance of steps in the digital procedure—characterized by scores exceeding a target threshold score—to the second facility. The computer system can also refine other steps in the digital procedure characterized by scores falling below the target threshold score—to reduce a prioritized requirement of risk, time, financial or other scoring type when transferred to the second facility, such as by: iteratively modifying the parameters of these steps based on skills, equipment, and/or processes available at the second facility and recalculating their scores accordingly; and/or by prompting a human operator at the first facility or the second facility to manually redefine these steps to reduce their scores when transferring the process to the second facility.

For example, the computer system can: receive a selection, such as from an operator at an initial facility within a network of manufacturing sites, to transfer a new digital procedure currently performed at the initial facility to a second facility in the network of manufacturing sites; access an instructional block library containing a set of verified instructional blocks associated with approved digital procedures performed (or "staged") at the second facility; and identify verified instructional blocks, in the set of verified instructional blocks contained in the instructional block library, analogous to instructional blocks contained in the new digital procedure. More specifically, the computer system can: detect a set of manufacturing inputs in an unverified instructional block contained in the new digital procedure; and identify a verified instructional block, contained in the set of verified instructional blocks, as analogous to the unverified instructional block in response to the verified instructional block including the set of manufacturing inputs detected in the unverified instructional block. Accordingly, the computer system can identify the verified instructional block by correlating: an equipment input in the unverified instructional block to a particular equipment unit (e.g., bio-reactor) located at the second facility; an operator permissions input to an operator profile associated with an operator located at the second facility; and an environmental input (e.g., sanitation requirement) to a particular location at the second facility.

In this example, the computer system can then calculate a transfer score proportional to a risk (e.g., fire exposure, hazard material exposure, batch yield output) for implementing the new digital procedure at the second facility based on: target parameters for the set of manufacturing inputs in the unverified instructional block from the new digital procedure; and parameters of the set of manufacturing inputs specified in the verified instructional block from the set of verified instructional blocks. In particular, the computer system can: detect deviations between parameters, such as corresponding to equipment unit types, calibration requirements, sanitation status, and minimum operator guidance; and calculate the transfer score based on the deviations. Accordingly, the computer system can then: responsive to calculating a transfer score as exceeding a threshold transfer score, insert the verified instructional block, in place of the unverified instructional block, in the new digital procedure; and stage the new digital procedure at the second facility, such as by modifying a procedure schedule at the second facility to include the new digital procedure.

Thus, the computer system can repeat this process across a network of manufacturing sites to: transfer digital procedures currently performed at an initial facility within the network of manufacturing sites; and implement these digital procedures at a particular facility or group of facilities within the network of manufacturing sites to reduce reliance on manual review and approval for implementing the new digital procedure.

Alternatively the computer system can, responsive to the transfer score falling below the target threshold score: modify parameters (e.g., change equipment units to an equivalent or comparable equipment type, change operators, change environmental conditions) for the second set of manufacturing inputs within the verified instructional block; and calculate a second scoring for performing the particular digital procedure at the second facility based on differences between the alternative parameters in the verified instructional block and the target set of parameters for the first set of manufacturing inputs.

1.3 Terms

Generally, a "transfer" as referred to herein is expanding operation within a first facility to also include a second facility within a corpus of facilities.

Generally, a "transfer score" as referred to herein is a magnitude of risk (e.g., fire exposure, hazard material exposure) for performing steps of a process associated with a facility at a different facility within a network of facilities.

Generally, a "golden batch range" as referred to herein is a batch condition, such as, quantity (e.g., grams) and quality (e.g., pH or measured values), above the standard condition for a completed instance (e.g., steps, sub-steps) of a manufacturing process by an assigned operator within a facility.

1.4 System

Generally, Blocks of the method S100 and S200 can be executed by a system including: a computer system, such as a remote server or a computer network; and a mobile device, such as a wearable device, a smartphone, a tablet, an augmented reality headset connected to another device, or a standalone augmented reality headset. For example, the mobile device can be an augmented reality headset, including a heads-up display, eyes-up display, head-mounted display, or smart glasses configured to render augmented reality content for an operator wearing this a mobile device. Alternatively, the mobile device can include a Wi-Fi-enabled smartphone or tablet connected to a separate augmented reality device, such as a wearable device removably attachable to the operator's coveralls, clean room gowning, and/or personal protective equipment, carried in a user's hand or worn on a lanyard on the user's neck. Alternatively, a fixed and/or persistently monitoring devices within the workspace can be deployed to support the operators performing procedures.

Furthermore, the mobile device can include: a suite of sensors configured to collect information about the mobile device's environment; local memory and/or cloud memory configured to temporarily store a localization map of a room; a display; a speaker or audio jack; and a controller configured to determine a location of the mobile device in real space, such as based on the localization map and data collected by the suite of sensors. For example, the mobile device can include: a depth camera paired with a 2D color camera; or a pair of stereoscopic 2D color cameras. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the pose of the mobile device within the room.

1.5 Digital Procedure

In one implementation, an operator affiliated with the facility loads an existing paper copy of a document outlining steps of a procedure for an equipment unit in the facility into an operator portal—hosted by the computer system, as described above—to create a digital form of this procedure. For example, the operator can scan the paper copy of the document with a smartphone, tablet, or dedicated scanner. Alternatively, the operator can directly access a digital (e.g., vectorized, digitized) copy of this document.

In this implementation, the operator portal (or the computer system) can implement text detection, recognition, and/or extraction techniques to automatically detect—in the digital copy of the document—text blocks (or "text descriptions") corresponding to individual steps in the procedure and to define individual steps of the procedure based on these text blocks. The operator portal (or the computer system) can also automatically interpret step numbers or step identifiers (e.g., 1, 2A-2C, 3.1-3.7, 4(A)-4(C), 5.1.a-5.4.c) for each of these steps and link or order these individual steps and their corresponding text blocks accordingly. Thus, the computer system can aggregate these steps into a sequence of instructional blocks contained in the digital procedure representing the steps of the procedure performed by the operator.

Additionally or alternatively, the operator portal can interface with the operator to isolate these text blocks and link these text blocks to individual steps. For example, the operator portal can interface with the operator to define individual steps or groups of steps as: prescribed (or "mandatory"); optional; or conditional (e.g., available or prescribed responsive to particular events or actions). The operator portal (or the computer system) can then generate a step tree for steps in the procedure based on these step definitions.

The operator portal can also interface with the operator to specify data input regions (e.g., capture fields, input fields, parameters) in this digital copy of the document. For example, the operator can highlight input fields (or "parameters") specifying manual recordkeeping in the digital copy, such as by highlighting a line or drawing a bounding box around a region in the digital copy of the document that specified recordation of a weight, pressure, temperature, density, or composition value read from a scale or dial on a machine or specifying recordation of a textual note. The operator can then link each highlighted input field in the digital copy to a data type or data class, such as: a numerical input value; a text or alphanumeric input value; an image; an audio recording; or a video recording.

The computer system can then implement methods and techniques described above to compile these data—including a text block for each step, input fields definitions for select steps, and an order or tree for these steps—into a digital draft procedure. The computer system can then interface with the operator or a team of operators—executing an exemplary instance of the procedure according to the digital draft procedure—to capture visual and special content representative of the procedure.

1.6 Generating the Digital Procedure

Generally, the computer system can: ingest a paper-based procedure; identify steps in the paper-based procedure; extract instructions (e.g., text-based instructions) for steps in the paper-based procedure; aggregate other supportive content for these steps, such as in the form of images, audio, video, or augmented reality content; compile these data into individual instructional blocks containing instructions in different formats corresponding to different levels of human-targeted guidance; and then order these individual blocks or define a pathway for these individual blocks (in a decision tree) to generate a new digital procedure. Upon receipt of this digital procedure, a mobile device can execute Blocks of the method S100 to serve instructions in each block in the digital procedure to a user in select formats according to a current minimum instruction guidance specification for the digital procedure, assigned the individual user, or assigned globally to all users in the facility.

In one implementation described in U.S. application Ser. No. 17/719,120, the computer system can: access an electronic document for a procedure in a facility; and identify a sequence of steps specified in the electronic document. In this implementation, the computer system can, for each step in the sequence of steps: extract an instruction in the text format, corresponding to a first degree of guidance, for the step; initialize a block, in a set of blocks, for the step; and populate the block with the instruction in the text format for the step. The computer system can also, for a first step including a first instruction in the text format: access the first instruction depicted in a second format corresponding to a second degree of guidance different from the first degree; and access the first instruction depicted in a third format corresponding to a third degree of guidance greater than the first degree and the second degree. Furthermore, the computer system can: compile the set of blocks into the digital procedure according to an order of the sequence of steps defined in the electronic document; append a first block, in the digital procedure, corresponding to the first step with the first instruction depicted in the second format and the first instruction depicted in the third format; set a minimum instruction guidance specification—defining a minimum degree of guidance for the first instruction—for the first block; and serve the digital procedure to a mobile device for presentation of instructions in the set of blocks to a user in formats specified by a minimum instruction guidance specification.

In another implementation, the computer system can: extract a manifest of target objects (e.g., equipment units, raw materials) from the electronic document associated with performance of the sequence of steps; identify target objects in the manifest of target objects linked to performance of the instructions stored within the sequence of blocks; and append these target objects to each block in the sequence of blocks. For example, the computer system can: access an electronic document for a procedure designated for performance at the first procedure zone within the facility; and identify a sequence of steps specified in the electronic document. In this example, the computer system can, for a first step in the sequence of steps: extract the first instruction in the text format for the first step from the electronic document; extract a manifest of target objects defined in the first step; initialize the first instructional block in the sequence of instructional blocks; and populate the first instructional block with the first instruction in the text format and the manifest of target objects. Therefore, the computer system can: initialize an instance of the digital procedure containing the populated sequence of blocks; render instructions (e.g., in text format, audio format, video format, AR format) for performing the digital procedure at devices assigned to operators performing the instructions;

and render target objects (e.g., list format, image format, AR format) at devices assigned to operators handling the target objects.

1.6.1 Text Format

In one implementation, an administrator affiliated with the facility loads an existing paper copy of a document outlining steps of a procedure for a machine in the facility into an administrator portal—hosted by the computer system—to create a digital form of this procedure. For example, the administrator can scan the paper copy of the document with a smartphone, tablet, or dedicated scanner; alternatively, the administrator can directly access a digital (e.g., vectorized, digitized) copy of this document.

The administrator portal can then interface with the administrator to: highlight a procedure identifier in the copy of the document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

The computer system can then implement text recognition, natural language processing, or other textual analysis or computer vision techniques to: detect breaks or textual indicators between consecutive steps in the process outlined in the document; extract textual descriptions and textual instructions for each of these steps; and distinguish instructional steps from data capture steps in this process based on these textual descriptions and/or instructions.

The computer system can then initialize one instructional block per instructional step thus identified in this process. For example, a generic instructional block can include multiple instructional layers, wherein each instructional layer is configured to store instructional content in one format, such as: text; audio; images or graphics (e.g., static images); video; prerecorded augmented reality content; responsive augmented reality content; and prerecorded or localized 3D content. For each instructional step thus identified in this process, the computer system can populate a first text layer in the corresponding instructional block with the textual description and/or textual instruction extracted from the corresponding step in the document outlining the process.

1.6.2 Audio Format

For each instructional step thus identified in this process, the computer system can also populate a second audio layer in the corresponding instructional block with an audio clip describing the corresponding step in the process.

In one example, for a particular instructional block in the digital procedure, the computer system can: implement text-to-speed methods to transform a text-based instruction—in the instructional block—into an audio clip of an automated voice reciting the text-based instruction; and then store this audio clip (i.e., the instruction in the audio format) in the audio layer of the particular instructional block. The computer system can repeat this process to automatically generate audio clips for other instructional blocks describing steps in the process.

Additionally or alternatively, the computer system can: interface with the administrator—via the administrator portal—to record audio clips of the administrator reciting instructional content related to these instructional blocks; and then store these audio clips in audio layers of the corresponding instructional blocks. However, the computer system can implement any other method or technique to access or generate audio content for audio layers in instructional blocks thus generated for this process.

1.6.3 Visual Format

The computer system can implement similar methods and techniques to extract graphics or other static visual content from the document outlining the procedure and/or access static visual content selected or uploaded by the administrator via the administrator portal. The computer system can then store this visual content in static visual content layers in corresponding instructional blocks for this process.

1.6.4 Video Format

The computer system can also populate video layers in all or select instructional blocks with video content (or "video clips").

In one implementation, after initializing the digital procedure with instructional blocks containing low-level guidance content extracted from the paper document outlining the procedure (e.g., after inserting capture blocks into the digital procedure), the computer system can serve the digital procedure to a mobile device associated with the administrator or other well-trained operator in the facility for completion of an initial (or "exemplary") instance of the new digital procedure. While the administrator or operator performs this first instance of the new digital procedure at a machine in the facility, the mobile device can record a video of this initial instance of the digital procedure, timestamp frames in this video, and tag these frames or video snippets with identifiers of concurrent instructional blocks in the digital procedure. The computer system can then: segment the video of this initial instance of the digital procedure into a set of video clips—each corresponding to one instructional block—based on these tags; and then load a video clip into the video layer in a corresponding instructional block in the digital procedure for all or a subset of these instructional blocks.

In another implementation, the computer system can interface with the administrator via the administrator portal to access prerecorded instructional videos for machines and equipment specified in the document and load these videos directly into video layers in corresponding instructional blocks in the digital procedure. Additionally or alternatively, the computer system can: implement natural language processing or other techniques to isolate words or phrases corresponding to equipment or specific processes specified within a step in the document; automatically retrieve video content related to these words or phrases; and then load this video content directly into a video layer of the corresponding instructional block in the digital procedure. For example, the computer system can detect a make and model number of a particular machine specified in a step in the process, search a database for a video described basic operation of this make and model number of the machine, and then download or link this video to the video layer in the corresponding instructional block. In this example, the computer system can also isolate a particular action at this make and model number of machine (e.g., "tare scale model X by manufacturer Y"), retrieve a video depicting this particular action at this make and model number of machine (e.g., a video entitled "how to tare scale model X by manufacturer Y"), and then download or link this video to the video layer in the corresponding instructional block.

The computer system can: implement similar methods and techniques to retrieve diagrams (i.e., static image or graphics) for particular equipment or equipment-specific action specified in steps outlined in the document; and then store these diagrams in static image layers in corresponding instructional blocks in the digital procedure. Additionally or alternatively, the computer system can implement similar methods and techniques to retrieve video clips describing operation or actions at particular equipment or equipment-specific action specified in steps outlined in the document; extract audio snippets from these video clips (or from video segments recorded during the initial instance of the digital procedure); and then store these audio snippets in audio layers in corresponding instructional blocks in the digital procedure. The computer system can implement similar methods and techniques to generate augmented reality overlays for instructional blocks from video recorded during the initial instance of the digital procedure, load augmented reality overlay content supplied by the administrator via the administrator portal, and/or retrieve augmented reality overlay data from an external database and then store these augmented reality overlay content in augmented reality layers in corresponding instructional blocks in the digital procedure.

The computer system can also: access audio and/or visual data collected during subsequent instances of the digital procedure by the same operator or other users in the facility over time; extract audio, video, augmented reality, or other visual content from these audio and/or visual data; and update layers in instructional blocks in the digital procedure based on these new data.

1.6.5. Capture Blocks

The computer system can also generate one capture block per capture step in the process. For example, a capture block can similarly include multiple capture layers, wherein each capture layer is configured to record data in one format or through one pathway, such as: manually-entered text; manually-entered numerical data; an image; a video; text or numerical data extracted automatically from an image or video feed recorded by a user's mobile device.

In one implementation, the computer system interfaces with the administrator via the administrator portal to specify data input regions in this digital copy of the document. For example, the administrator can highlight input fields specifying manual recordkeeping in the document, such as a line or box for recording a weight, pressure, temperature, density, or composition value read from a scale or dial on a machine or for recording a textual note. The administrator can then link each region of interest in the document to a primary data type or data class, such as manual text or numerical entry, manual audio or visual capture, or automated audio or visual capture. The administrator can also specify secondary and/or tertiary capture for a particular capture block, such as manual numerical entry as a primary data type augmented with automated video capture and automated numerical value extraction from captured video to verify manual numerical entry. The computer system can define and selectively enable layers in each capture block in this digital procedure according to such input from the administrator.

1.6.6 Digital Procedure Assembly

The computer system can similarly retrieve blocks of other types—such as described below—and populate these blocks with data extracted from the document and/or with data entered by the administrator. The computer system can then order these blocks according to the sequence of steps outlined in the document and assemble these blocks into one new digital procedure accordingly.

However, the computer system can implement any other method or technique to generate a digital procedure.

1.6.7 Instructional Block Formats

Therefore, the computer system can aggregate instruction data in different formats—such as in textual, static image or graphical, audio, video, prerecorded augmented reality, and/or responsive augmented reality formats—for each instructional block in the digital procedure. The computer system can also assign a guidance value to each instruction format in an instructional block.

In one implementation, the computer system implements a preset guidance scale in which instruction formats are ranked, in increasing order of guidance level, from textual format to graphical format, then audio format, static image format, video format, prerecorded augmented reality format, and/or finally responsive augmented reality format.

For example, the digital procedure can contain a sequence of instructional blocks including the first instructional block describing a first instruction in the set of formats including: a text format including a textual description of a first process step in the digital procedure (e.g., extracted directly from the paper-based document outlining the procedure) and characterized by a first degree of guidance; an audio format including an audio recording of a (real or automated) voice describing the first process step and characterized by a second degree of guidance greater than the first degree; a visual format including a video clip depicting performance of the first process step (e.g., recorded during an "exemplary" instance of the digital procedure or including a technical manufacturer's video describing operation of its equipment) and characterized by a third degree of guidance greater than the second degree; and an augmented reality overlay (generated based on manual augmentation of a video of an "exemplary" instance of the digital procedure) corresponding to a fourth degree of guidance greater than the third degree.

Alternatively, the administrator can manually label guidance levels for each format in an instructional block, and the computer system can rank or sort these instruction formats within an instructional block accordingly.

1.7 Loading the Digital Procedure

Generally, a mobile device assigned to or carried by a user can access a digital procedure in preparation for the user performing a next instance of the digital procedure.

In one implementation, a user's mobile device automatically initializes a new instance of a digital procedure based on proximity of the mobile device to a machine, equipment, or location scheduled for the corresponding procedure. In this implementation, the mobile device can track its location and orientation within the facility. As the user approaches the machine in preparation for performing this procedure, the mobile device—worn or carried by the user—can track its location within the facility and identify a particular machine with which the user is interfacing based on this location. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the space occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or a computer system) can then query a map of machines throughout the facility for a particular machine adjacent and facing the mobile device—and therefore the user—based on the position and orientation of the mobile device in real space. Alternatively, the mobile device can identify the particular machine directly by matching a constellation of features detected in images recorded by the camera to a known, unique constellation of features associated with this particular machine.

For example, the mobile device can: track a location of the second operator device within the facility; detect a set of equipment units proximal the second operator device based on the location of the second operator device within the facility; retrieve a list of digital procedures, including the first digital procedure, associated with the first set of equipment units; serve the list of digital procedures on a display (e.g., visually render a list of procedures at the display) of the second operator device; and load the first digital procedure from a database to the second operator device in response to selection of the first digital procedure, from the list of digital procedures by the second operator.

The mobile device can regularly execute this process to monitor its position and orientation within the facility and detect machines nearby. Then, when the user stops for more than a threshold duration of time (e.g., ten seconds) or when the mobile device determines that its location has moved less than a threshold distance within a period of time (e.g., one meter in ten seconds), the mobile device can: query the digital procedure database for a digital procedure associated with a machine nearest the current position of the mobile device; and automatically load an instance of this digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the user to select from the list; and download an instance of a particular digital procedure associated with a machine selected by the user. For example, the mobile device can: track its location within the facility; detect a set of machines nearby based on a map of the facility and the location of the mobile device within the facility; retrieve a list of digital procedures associated with this set of machines; render this list of digital procedures on a display of the mobile device; download a particular digital procedure from a database (e.g., a remote server via a wireless network) in response to the user selecting this particular digital procedure from the list of digital procedures; and then initialize a new, local instance of the particular digital procedure accordingly at the mobile device.

Alternatively, the user can manually select (or "pull") the particular machine directly from a dropdown list of machines or select the particular digital procedure directly from a dropdown list of digital procedures for all machines and equipment in the facility. The mobile device can then initialize a new, local instance of this digital procedure selected manually by the user.

1.8 Next Block

In one implementation, the computer system can initialize a second block in the digital procedure in response to completion of the first instructional block. Generally, the mobile device can initiate a next block in the digital procedure—such as a next instructional block or a capture block—upon completion of the preceding instructional block in the digital procedure. For example, the mobile device can complete a first instructional block in the digital procedure and initiate a second block in the digital procedure in response to: completion of an audio, video, or augmented reality clip in the first instructional block; manual confirmation from the user to move to the next block; manual entry or automatic capture of a value instructed in the first instructional block; or a change in location or orientation of the mobile device that indicates completion of the first instructional block. The mobile device can then repeat the foregoing methods and techniques to serve instructions in the next instructional block to the user according to a minimum instruction guidance specification or implement methods and techniques described below to guide the user through a capture block.

(Furthermore, to move to a next block in the digital procedure, the user can confirm that the current block in the digital procedure is completed. While the mobile device can enable the user to repeat the current block of the digital procedure, the mobile device can also store timestamped information captured during the first instance of the current step in an audit-trail log and can prioritize data captured during a most-recent version of the current step—completed by the user during this instance of the digital procedure—in the audit-trail log. Additionally, the next instructional block can be linked to another module in the same or other digital procedure. In one example, in which the user drops a filter and in which this error is linked to a secondary module in the same digital procedure, the mobile device can serve a standard sequence of blocks—excluding this secondary model—in this digital procedure to the user by default but then selectively serve blocks in the secondary module to the user only in instances in which the user indicate manually that she dropped the filter or in which the mobile device automatically detected the dropped filter.)

1.9 Capture Block

In one variation, the mobile device implements similar methods and techniques to enforce pathways for capturing data in capture blocks within the digital procedure.

In one implementation, the computer system initializes a capture block for recordation of data and incorporates this capture block in a digital procedure based on steps in a process outlined in a paper document, as described above. For example, the capture block can define a set of layers for data capture, including: manual numerical entry; manual text entry; manual selection from a prepopulated list of values; manual image capture at the mobile device; manual video capture; automatic image capture; automatic video capture; and automatic value (e.g., numerical value) capture from a static image or video stream. The computer system can thus interface with an administrator to selectively enable these data capture layers in the capture block. Alternatively, the computer system can automatically enable these data capture layers in the capture block based on data verification or validation requirements outlined in the document. For example, the computer system can specify both manual data entry and automatic data capture (e.g., an image or video) with automatic data extraction (e.g., extraction of a numerical value from an image or video) for a step designating reviewer verification in the document. The computer system can store minimum types or combinations of these data capture pathways in a capture mode specification for the particular data capture block, for data capture blocks of this type, for the digital procedure, or for a particular user. Later, when the mobile device initializes the current instance of the digital procedure and then initiates this data capture block, the mobile device can: access the capture mode specification assigned for the digital procedure; and then prompt the user to record data in select capture formats—in the set of capture formats enabled in the data capture block—based on this capture mode specification.

Additionally or alternatively, the computer system can implement methods and techniques described below to define a capture mode specification for the particular data capture based on historical results of digital procedures completed in the facility over time. For example, the computer system can define redundant data capture pathways for data capture blocks, including (in order of increasing automation and reduced operator autonomy): manual data entry with manual verification via a digital image of a machine or process recorded manually by a user; manual data entry with manual verification via a digital image of a machine or process recorded automatically by a mobile device; manual data entry with automatic verification via a digital image of a machine or process recorded manually by a user; manual data entry with automatic verification via a digital image of a machine or process recorded automatically by a mobile device; and automatic data extraction and verification via a sequence of digital images recorded automatically by a mobile device. Thus, for a data capture block that specifies input of a numerical value, the computer system can assign a capture mode specification that defines increased automation and reduced operator autonomy proportional to a rate of error in manual entry of numerical values by operators during past instances of digital procedures in the facility. During the current instance of this digital procedure, the mobile device can guide the user in capturing data according to this capture mode specification, such as by prompting the user to enter a numerical value, record an image or video, and/or point the mobile device toward a particular machine or equipment to enable the mobile device to automatically capture an image or video and extract data from this image or video accordingly.

The computer system can also update the capture mode specification for this capture block in the digital procedure over time. For example, the computer system can: access an historical record of instances of the digital procedure performed previously by the user; detect errors related to the capture block during instances of the digital procedure performed previously by the user based on the historical record; and then refine the capture mode specification for the user to specify a quantity of capture formats for the capture block in the current instance of the digital procedure proportional to a rate of errors related to the capture block during previous instances of the digital procedure performed by the user. The computer system can similarly revise the capture mode specification for this capture block based on results from instances of the digital procedure performed by other operators in the facility, such as including: specifying more manual and automated capture pathways for greater redundancy responsive to increased data capture or process errors, which can reduce longer-term error rates; specifying fewer manual and automated capture pathways for less redundancy responsive to low or decreased data capture or process errors; and specifying one manual and automated capture pathway only for no redundancy responsive to low or null rates of data capture or process errors in order to reduce digital procedure durations and increase operator autonomy.

Additionally or alternatively, an instructional block can include a capture component, and the computer system can implement similar methods and techniques to define both a minimum instruction guidance specification and a capture mode specification for this instructional block. The mobile device can then implement methods and techniques described above to enforce both the minimum instruction guidance specification and the capture mode specification during this instructional block in a next instance of the digital procedure performed by a user.

1.10 Modifiable Digital Procedure

Generally, a mobile device (or the computer system) assigned to and/or carried by an operator can access a digital procedure in preparation for the operator to modify a current instance of the digital procedure. The modifiable digital procedure represents a procedure that is currently being authored or currently under review but not in an approved state where it has been signed-off on or validated for processing, such as by a reviewer overseeing procedures performed within a network of facilities. Furthermore, a modifiable digital procedure can alternatively be pending review for a regular review cycle period (i.e., every two years) or after a deviation event for the digital procedure takes place where the procedure is re-examined after an event takes place.

In one implementation, an operator's mobile device automatically initializes a new digital procedure based on proximity of the mobile device to an operator cell and/or equipment unit for the corresponding procedure. In this implementation, the operator performs a current instance of the digital procedure at the operator cell deviating from previous instances of the digital procedure. The mobile device can track its location and orientation within the facility. As the operator approaches the operator cell in preparation for performing this procedure, the mobile device—worn or carried by the operator—can track its location within the facility and identify a particular operator cell with which the user is interfacing based on this location. In response to identifying this particular operator cell within the facility, the mobile device can then access a modifiable instance of the digital procedure.

In one example, the mobile device can: identify a particular assembly cell proximal to the operator; access a list of operators associated with a particular assembly cell; and query the list of operators for approved operators granted permissions to modify current instances of the digital procedure. In response to locating an approved operator—in the list of operators—to modify the digital procedure, the mobile device can then load a modifiable instance of the digital procedure for the operator and present the digital procedure to the operator via an integrated display on the mobile device. The operator can then—at the mobile device—modify instructional blocks in the digital procedure, such as by modifying text, capturing media, video editing, modifying value ranges. The computer system can then concurrently record these modifications to the digital procedure in a procedure log for the current instance of the digital procedure indicating the modifications performed by the operator.

Therefore, the computer system can: transmit this modified digital procedure including the procedure log to a reviewer device associated with a reviewer; and queue the modified digital procedure at the reviewer device for approval, thereby expediting approval of alternative versions of digital procedures performed within the facility.

Alternatively, the computer system can transmit the modified digital procedure and the procedure login to the reviewer device in real-time, thereby enabling the reviewer to observe changes to the digital procedure as the operator performs the current instance of the digital procedure.

Alternatively, the digital procedure can be performed by a contract manufacturing organization for a client, the reviewer can be external to the organization manufacturing the product, where the reviewer at a client company will need to provide approval for the changes made to the digital procedure through the platform securely.

In another implementation, the operator can selectively load a modifiable digital procedure to the operator's corresponding mobile device based on an operator profile associated with the operator in order to perform a current instance of the digital procedure that deviates from previous instances of the digital procedure. In this implementation, the operator profile can indicate permissions for the operator to modify digital procedures carried out within the facility. The operator can then approach a particular operator cell and/or particular equipment unit within the facility. The computer system can then: serve the operator with a list of approved digital procedures performed at the facility in response to authenticating operator permissions in the operator profile; and, in response to receiving selection of a digital procedure in the list of approved digital procedures, load a modifiable digital procedure associated with the particular operator cell and/or equipment unit.

In one example, the computer system can: locate the operator in a particular testing lab within the facility; access an operator profile associated with the operator and containing a list of permissions; query the list of permissions to locate modifying permissions in the list of permissions; and serve a prompt to the operator to select a digital procedure from a set of digital procedures associated with the facility in response to locating the operator in the testing lab within the facility and authenticating operator permissions in the operator profile. The computer system can then confirm selection of a particular digital procedure in the set of digital procedures from the operator and load a modifiable version of the particular digital procedure. Therefore, the computer system can enable operators to selectively load currently approved digital procedures performed within the facility in order to modify these currently approved digital procedures to generate new digital procedures at the facility.

In yet another implementation, the computer system can access a modifiable digital procedure for multiple operators within the facility in order to cooperatively modify a current instance of the digital procedure. In one particular workflow, a conductor in the facility can—in real-time—modify a current instance of the digital procedure via a conductor device associated with the conductor. The computer system can then: transmit—in real-time—this modified digital procedure to an operator device associated with the operator; and serve guidance to the operator for performing this modified digital procedure.

1.11 Instructional Block Library

Blocks of the method S100 recites accessing an instructional block library containing a set of verified instructional blocks associated with approved digital procedures performed at the first facility in Block S130. Generally, the computer system can access an instructional block library containing a set of instructional blocks associated with approved digital procedures performed within the facility. Accordingly, the computer system can retrieve the instructional block library in preparation for modification of a current instance of a digital procedure.

In one implementation, the computer system can: access a geospatial location of the mobile device; identify a facility containing the geospatial location of the mobile device; automatically retrieve the instructional block library, such as from a remote computer system; and load the instructional block library at the mobile device for presentation to the operator. Furthermore, during performance of a modifiable digital procedure, the computer system can then automatically and/or selectively: replace instructional blocks in a current instance of the digital procedure with instructional blocks from the instructional block library; and/or add instructional blocks retrieved from the instructional block library to the current instance of the digital procedure.

For example, the mobile device can: retrieve a modifiable digital procedure containing a particular set of instructional blocks; retrieve the instructional block library containing sets of approved instructional blocks performed within the facility including the particular set of instructional blocks for the modifiable digital procedure; and present the modifiable digital procedure and these sets of instructional blocks to the operator, such as via a digital display at the mobile device associated with the operator during performance of the modifiable digital procedure. In this example, the computer system can: in response to initializing a first instructional block in the modifiable digital procedure, present a list of alternative instructional blocks for the first instructional block defined in the instructional block library to the operator; and receive confirmation of selection—by the operator at the mobile device—for an alternative instructional block from the list of alternative instructional blocks presented to the operator. The computer system can then: modify the current instance of the modifiable digital procedure to replace the first instructional block with the alternative instructional block selected by the operator; and record this modification in a procedure log for this modifiable digital procedure.

In another example, the computer system can: retrieve a modifiable digital procedure containing a particular set of instructional blocks; receive a selection—by the operator at the mobile device—to remove one or more instructional blocks in the particular set of instructional blocks for the modifiable digital procedure; and present this modified digital procedure to the operator at the mobile device. Additionally, the computer system can: retrieve the instructional block library containing sets of approved instructional blocks performed within the facility; and present the instructional block library to the operator at the mobile device. The computer system can then: receive selection of one or more instructional blocks from the instructional block library by the operator at the mobile device; and load these instructional blocks from the instructional block library to the current instance of the digital procedure. Furthermore, the computer system can: modify an order of these instructional blocks in the modified digital procedure upon selection from the operator; and generate a new digital procedure containing instructional blocks from the retrieved digital procedure and instructional blocks retrieved from the instructional block library; and transmit this new digital procedure to a reviewer for approval and/or review.

Therefore, the computer system can: modify a current instance of the digital procedure with instructional blocks from the instructional block library; generate a new digital procedure based on instructional blocks within the current instance of the digital procedure and approved instructional blocks retrieved from the instructional block library; and thereby expediting the approval process of this new digital procedure by implementing these facility approved instructional blocks from the instructional block library.

1.11.1 Generating the Instructional Block Library

In one implementation, the computer system can: aggregate approved instructional blocks from each digital procedure performed at the facility; compile these instructional blocks from these digital procedures into an instructional block library; and store the instructional block library, such as at the remote computer system, for retrieval by devices within the facility. In particular, the computer system can: access an electronic document for a procedure in a facility; identify a sequence of steps specified in the electronic document; extract an instruction for each step in the sequence of steps; initialize an instructional block, in a set of instructional blocks for this step; and populate the instructional block with the instruction. The computer system can then: repeat this process for multiple electronic documents corresponding to multiple procedures at the facility; and store these sets of instructional blocks in the instructional block library contained at a remote computer system.

In this implementation, the computer system can: access a record of instances of digital procedures completed (or "previously performed) by operators at the facility; and identify a subset of instances of verified digital procedure in the record of instances of digital procedures. In this example, each instance of a verified digital procedure in the subset of instances of verified digital procedures is: performed by an operator at the facility; and validated as a verified digital procedure by a reviewer overseeing digital procedures performed at the facility. In one example, the computer system can: present the record of instances of digital procedures to a reviewer (e.g., at a reviewer device) assigned to oversee digital procedures performed at the facility; and receive selection of instances of digital procedures, in the record of instances of digital procedures, from the reviewer to identify an instance of a digital procedure as a verified digital procedure. The computer system can then: initialize the instructional block library; and store instructional blocks in the verified digital procedure as a verified instructional block in the instructional block. In particular, for each instance of a verified digital procedure in the subset of instances of verified digital procedures, the computer system can: detect a sequence of instructional blocks representing a sequence of steps for the verified digital procedure; and, for each instructional block in the sequence of instructional blocks, store the instructional block as a verified instructional block in the instructional block library.

In another implementation, the computer system can: retrieve a particular instructional block from the instructional block library; modify text, media, values, in this particular instructional block; generate a new instructional block based on this modified instructional block; and store this new instructional block in the instructional block library.

In one example of this implementation, the mobile device can: retrieve the instructional block library from a remote computer system; present the instructional block library to the operator at the mobile device; and confirm selection of a particular instructional block—by the operator—in the instructional block library presented to the operator. The computer system can then: load a modifiable instance of this particular instructional block at the mobile device of the operator; modify instructions, such as in the form of text, audio media, and visual media populated in the particular instructional block; record these modifications in a block procedure log for the particular instructional block; and generate a new instructional block based on this modified instructional block. Therefore, the computer system can generate new instructional blocks based on previously approved instructional blocks for digital procedures performed within the facility and thereby expedite review and approval process of this new instructional blocks.

In yet another implementation, the computer system can: at the mobile device of the operator, initialize a new instructional block; and generate a prompt for an operator to populate the new instructional block with an instruction. The computer system can then: serve this prompt at the mobile device of the operator; receive the instruction at the mobile device from the operator; and store this new populated instructional block at the instructional block library. For example, the computer system can: receive visual media for an instruction recorded by the operator via an optical sensor at the mobile device; receive a string of text from the operator representing the instruction via a computing interface at the mobile device; and/or receive audio media of the instruction recorded by the operator via a microphone at the mobile device. Additionally, the computer system can then populate the new instructional block with the text strings, audio media, and/or visual media received from the operator. Furthermore, the computer system can: confirm population of the new instructional block with the instruction from the operator; transmit this new instructional block to a reviewer device associated with a reviewer; and queue the new instructional block for approval and review by the reviewer.

A particular instructional block in the instructional block library can include data associated with the particular instructional block for the computer system to link the blocks to a step and/or series of steps contained within a modifiable digital procedure. For example, the particular instructional block can include labels or tags associated with this particular instructional block so an association can be made between the instructions that the particular instructional block provides, procedures currently linked to the particular instructional block, and what types of procedures and steps can be associated with the particular instructional block. Labeling of the instructional blocks allows for instructional blocks to be associated with related procedures, common procedures, equipment linked procedures, method linked procedures, or other procedure types. Instructional blocks can be uploaded from an external organization and receive labeling and/or tags when they are uploaded into the platform for association of client linked procedures for a contract manufacturing organization, where those instructional blocks are only linked to a specific client's procedures or an equipment vendor's instructional blocks where they are only linked to procedures involving that specific model of the vendor's equipment.

Additionally or alternatively, an instructional block in the block library can undergo scoring where each block receives a score for the quality of the instruction and the applicability to the procedures that they are currently linked to. In one example, an instructional block is scored by the clarity of the content, such as the clarity of the text, the audio quality of an audio clip (e.g., no static or distracting background noises), the video quality of the pixels, screen sizing, angle, and the clarity of the instructional material being shown. The quality scoring can include the conciseness of the material in the instructional block where the same level of instructional material is conveyed in a faster way compared to taking a significantly longer period of time to convey the same information. The quality of the scoring can contain the accuracy of the material where the instructional block can contain inaccurate information or outdated methods which would make it ineligible for linking to existing or new procedures. The scoring for the applicability to the procedures can include the relevance of the label and/or tags to the contents of the instructional block, the number of procedures and the types of procedures the instructional block is already linked to, and the operator voting over where they can upvote or downvote an instructional block for the quality of the content in the instructional block and the strength of the applicability to the procedures it is currently linked to. This scoring of the instructional blocks can be manually added by users and/or procedurally generated through an automated analysis algorithm.

1.11.2 Connected Manufacturing Network

In one implementation, the computer system can: retrieve digital procedures performed across a network of facilities; identify verified instructional blocks in the digital procedures performed across the network of facilities; and aggregate the verified instructional blocks into an instructional block library representing verified steps of procedures performed across the network of facilities. Accordingly, the computer system can: access an unverified draft instructional block for a new digital procedure authored by an operator; as described below, identify a verified instructional block in the instructional block library analogous to the unverified draft instructional block and corresponding to a particular facility in the network of facilities; replace the unverified draft instructional block in the new digital procedure with the verified instructional block from the instructional block library; and assign the new digital procedure to the particular facility corresponding to the verified instructional block.

Therefore, the computer system can: retrieve verified instructional blocks corresponding to one or more facilities (e.g., manufacturing sites, testing facilities); compile the verified instructional blocks into an instructional block library; and implement the instructional block library to identify verified instructional blocks analogous to unverified draft instructional blocks of a new digital procedure.

1.12 New Digital Procedure

Blocks of the method S100 recites: receiving a selection to transfer a new digital procedure to a first facility within the corpus of manufacturing sites in Block S110; in response to receiving the selection, accessing a first unverified instructional block in the new digital procedure for staging at the first facility in Block S120. Generally, the computer system can: access a new digital procedure, such as authored by an operator for the facility, or transferred from a particular facility within a network of manufacturing sites; and identify unverified draft instructional blocks in the new digital procedure in order to imitate a verification cycle to identify verified instructional blocks analogous to the unverified draft instructional blocks. In particular, the computer system can: receive a modification to text content, audio content, and visual content in the unverified draft instructional block from the operator; characterize a scope of the modification in the unverified draft instructional block; and, in response to the scope of the modification exceeding a threshold scope of modification, initiate the verification cycle.

In one implementation, the computer system can: retrieve a verified instructional block from a verified digital procedure currently performed at the facility; and initialize an unverified draft instructional block based on representing a modifiable instance of the verified instructional block. Accordingly, the unverified draft instructional block can include text content, audio content, and visual content (e.g., video clips) extracted from the verified instructional block. The computer system can then: present the unverified draft instructional block to the operator (e.g., at an operator device); and receive modifications to the text content, audio content, and visual content from the operator. The computer system can then initiate a verification cycle, as described below, to identify verified instructional blocks in the instructional block library that are analogous to the unverified draft instructional block.

For example, the computer system can: access a verified digital procedure—corresponding to a digital procedure previously performed by operators at the facility—containing a verified instructional block including a first instruction in a text format; and initialize the unverified draft instructional block representing a modifiable instance of the verified instructional block including the first instruction in the text format. The computer system can then: render the unverified draft instructional block, including the first instruction in the text format, at a display of the operator device; receive modification (e.g., edit body of text) of the first instruction in the text format from the operator at the operator device; compile the unverified draft instructional block including the first instruction in the modified text format into the new digital procedure; and transmit the new digital procedure to a remote computer system. Accordingly, the computer system can then initiate a verification cycle, as described below, to identify a verified instructional block analogous to the unverified draft instructional block.

In another implementation, the computer system can: ingest an electronic document, such as drafted by the operator at the computer system, representing a new process performed at the facility; extract a sequence of steps from the electronic document; and transform the sequence of steps into the new digital procedure. The system can then initiate the verification cycle, as described below, to identify verified instructional blocks analogous to unverified draft instructional blocks in the new digital procedure.

For example, the system can: at a computer system, access an electronic document for a new procedure in the facility authored by the operator; and scan the electronic document to identify a sequence of steps specified in the electronic document. The system can then: extract an instruction in a text format for a first step in the sequence of steps; initialize a first unverified draft instructional block, in a set of unverified draft instructional blocks, for the first step; and populate the first unverified draft instructional block with the first instruction in the text format for the first step. Accordingly, the system can then repeat these steps for each step in the sequence of steps to populate the set of unverified draft instructional blocks.

The system can then: compile the set of unverified draft instructional blocks into the new digital procedure; and store the new digital procedure, such as within internal memory of the computer system. The system can then: access the new digital procedure containing the set unverified draft instructional blocks; and scan a first unverified draft instructional block, in the set of unverified draft instructional blocks, to identify a set of language signals during a verification cycle as described below.

Additionally, in the aforementioned example, the computer system can serve the new digital procedure to an operator device associated with the operator for completion of a first instance of the new digital procedure in the facility. Furthermore, the operator device can: record a media file, such as via an optical sensor coupled to the operator device, representing completion of the first instance of the new digital procedure in the facility; and transmit the media file to the computer system. The computer system can then: segment the media file into a set of media clips; and populate each unverified draft instructional block, in the set of unverified draft instructional blocks, with a corresponding media clip in the set of media clips.

Therefore, the computer system can: ingest a new digital procedure authored by an operator for performance at the facility; identify unverified draft instructional blocks in the new digital procedure; and initiate a verification cycle to identify verified instructional blocks analogous to the unverified draft instructional blocks in the new digital procedure.

1.12.1 Operator Profiles

In one implementation, the computer system can access an operator profile associated with the operator authoring the new digital procedure and specifying: a set of permissions for modifying digital procedures associated with the facility; and a minimum guidance specification for performing digital procedures associated with the facility. Accordingly, the computer system can then: access the instructional block library containing the set of verified instructional blocks based on the set of permissions in the operator profile; and access the set of language signals based on the minimum guidance specification in the operator profile.

For example, the computer system can: access an operator profile associated with the operator authoring the new digital procedure at the facility; extract a set of permissions from the operator profile specifying a list of equipment units authorized for handling by the operator; and restrict the operator from authoring and/or modifying digital procedures associated with equipment units absent from the list of equipment units. In another example, the computer system can: access an operator profile associated with the operator authoring the new digital procedure at the facility; extract a minimum guidance specification specifying a risk exposure threshold for the operator; and restrict the operator from authoring and/or modifying digital procedures associated with a risk exposure exceeding the risk exposure threshold.

Therefore, the computer system can: restrict access to the instructional block library according to an operator profile associated with the operator authoring the digital procedure; and minimize risk exposure to inexperienced operators authoring digital procedures for the facility.

1.13 Manufacturing Inputs

Generally, the computer system can: extract manufacturing inputs from instructional blocks in digital procedures and/or in an instructional block library; populate an input container (e.g., vector) with the manufacturing inputs extracted from these instructional blocks; and modify parameters (e.g., equipment unit settings, operator actions)—from baseline parameter values—of the manufacturing inputs within the input container. In particular the computer system can: access a global input manifest for representing global manufacturing inputs for a particular facility in a network of facilities; identify a set of manufacturing inputs in the global input manifest analogous to an extracted set of manufacturing inputs for a particular instructional block; and populate a transfer input container with the identified analogous set of manufacturing inputs for the particular instructional block.

Thus, the computer system can modify parameters—from baseline parameter values—of the set of manufacturing inputs within the transfer input container in order to: match a set of target parameter values specified in the digital procedure for performing the particular instructional block; and/or mitigate risk for performing this particular instructional block at a different facility in a network of facilities.

1.13.1 Extracting Manufacturing Inputs

In one implementation, the computer system can: receive selection from an operator of a particular digital procedure currently performed within a first facility and containing a sequence of instructional blocks; extract a set of manufacturing inputs from a particular instructional block in the particular digital procedure representing manufacturing inputs (e.g., equipment units, operator profiles, environmental conditions) utilized by operators during performance of the particular digital procedure; and initialize an input container (e.g., vector) for the particular instructional block. The computer system can then populate the input container with: the set of manufacturing inputs extracted from the particular instructional block; and a set of target parameters (e.g., temperature readings, equipment unit settings, operator profiles) for the set of manufacturing inputs extracted from the particular instructional block. The computer system can thus: store this input container within a remote access database at the computer system; and/or transmit this input container to a second computer system located within a second facility in a network of facilities.

For example, the computer system can: receive selection from an operator of a particular instructional block—in the digital procedure—containing a particular instruction for handling a set of equipment units (e.g., mixers, centrifuges); extract a set of equipment unit labels (e.g., model types) from the particular instructional block corresponding to equipment units handled by operators during performance of the particular instruction; initialize an equipment unit container (e.g., vector) for the particular instructional block; and populate the equipment unit container with the set of equipment unit labels extracted from the particular instructional block. In this example, the computer system can then: repeat this process to extract equipment unit labels for each instructional block in a sequence of instructional blocks for a particular digital procedure; and store manufacturing inputs specified for each instructional block in the sequence of instructional blocks within a set of input containers for the particular digital procedure.

Therefore, the computer system can: access a stored set of manufacturing inputs corresponding to a particular instructional block for a digital procedure; and identify a second set of manufacturing inputs in a manifest of manufacturing inputs that are analogous (e.g., matching equipment unit labels, matching environmental conditions, matching operator profiles) to the stored set of manufacturing inputs.

1.12.2 Examples: Manufacturing Inputs

Examples of manufacturing inputs can include facility location (e.g., distance between transportation links and infrastructure), facility size, facility age, facility specialization, number of buildings at a facility site, facility regulatory approval, facility utilities (e.g., power, water, network access, WiFi, clean steam, clean-in-place), facility features (e.g., warehousing, cold room storage, fill-finish, release lab testing, packaging), and facility support infrastructure (e.g., office space, bathrooms, parking). Additionally, manufacturing inputs can include building materials, property size, facility ownership, ability to perform facility expansion, local zoning laws and variances (e.g., potential time delays for new or modifying construction), environmental factors for facility location (e.g., climate, risk of natural disasters, HVAC requirements, safety and security), classified air purification coverage (ISO classification), room sizes, and room attributes. The manufacturing inputs can also include equipment units, number of equipment units, equipment unit types, equipment capacity, equipment unit ages, equipment unit calibration and service status, manufacturing schedule and available capacity, operator shifts at facility, operator profiles, operator training, operator specialization, and available expertise at the facility.

Additionally, the computer system can identify a set of parameters corresponding to the manufacturing inputs contained in the digital procedure and corresponding to the facility. For example, for example, adjusting the parameter values in a procedure where a first facility utilizes a 1,000 L mixing vessel and a secondary facility where the process is being transferred to utilizes two smaller 500 L vessels if a 1,000 L mixing vessel is not available. This does not alter the transferred process in any significant way but allows for the updating of the procedure parameters when transferring a process to a secondary facility that doesn't have the same equipment as the first facility. The fact that the second facility does not have the exact same equipment (i.e. a 1,000 L mixing vessel) does not remove it from the list of possible sites to transfer a process to, if it has equivalent equipment and operator expertise for performing the process at the facility. The change in the process allows for the computer system to automatically update the transferred procedure instructional blocks to include the process of splitting the batch for this mixing step to accommodate the change in the equipment available at the facility. The change in the process can affect the overall transfer scoring for this secondary facility compared to an alternate secondary facility that is already using the same equipment as the first facility which would lower the risk of transferring a process to a facility already familiar with the same equipment and process prior to the transfer of a new process utilizing the same equipment and methods.

In an alternate embodiment the modified parameters can include the use of comparable equipment which is used in one facility but not another. This can be the case for the instructional blocks from a process transfer where one facility utilizes a piece of equipment, such as a first type of 20 kg scale (e.g., manufactured by a first company) at a first facility and the instructions for the transferring procedure in the instructional blocks reference the steps for utilizing this particular balance for the process. A second facility can utilize an alternate scale from a different manufacturer, such as a second type of 20 kg scale, where the instructional blocks of the transferred process can be automatically updated to include the instructions from the block library for utilizing an alternate testing piece of equipment. The instructional blocks, contained in the digital procedure, can include required equipment, if a comparable equipment, consumable, raw material, can be utilized, a list of equipment that can be utilized for the execution of that procedure and links to the instructional blocks for the steps to utilize this alternate equipment so the instructional blocks can be seamlessly substituted when a process is transferred to a secondary facility without needing to rework the transferred procedure.

1.13.3 Generating Manifest of Manufacturing Inputs

In one implementation, a first computer system within a particular facility can: access an instructional block library containing a set of instructional blocks corresponding to an approved list of steps for procedures performed within a particular facility; extract a set of manufacturing inputs (e.g., equipment units, operators, environmental conditions) from each instructional block in the instructional block library; and compile these manufacturing inputs into a global input manifest representing a corpus of manufacturing inputs received at the particular facility. The computer system can then: transmit (e.g., wirelessly via networked computer systems, a secure cloud-based computer system) the global input manifest for the particular facility to a second computer system within a second facility; and store this global input manifest, such as within a remote access database in the second computer system.

For example, a first computer system within a first facility can: access an instructional block library containing instructional blocks corresponding to approved steps of procedures performed within the first facility; extract a set of equipment unit labels (e.g., equipment unit types, model numbers) from each instructional block in the instructional block library corresponding to equipment units utilized during performance of the instructional block; initialize a global input manifest (e.g., container, vector) for the first facility; and compile these sets of equipment unit labels in the global input manifest representing equipment units utilized by operators to perform procedures within the first facility.

Therefore, the computer system can: compile a set of global input manifests representing receivable manufacturing inputs for each facility within a network of facilities; rank the facilities for the best fit in the order of the risk, time, or financial scoring based on the priority of the requirements, depending on the requirements the reviewer is searching for and store the set of global input manifests within a remote access database at the computer system.

The global input manifests representing the receivable manufacturing inputs for each facility can be multi-enterprise, which include facilities that are both internal and external to the organization. Commercial Contract Manufacturing Organizations (CMOs or CDMOs) can be available on the ranked manifest of facilities based on the CMOs facility having the ability to receive the input container (e.g., vector) for the particular instructional blocks, have the input container transferred to the CMO facility, and execute the steps based on the instructional blocks. The CMO facility would need to meet the procedure requirements (i.e. the required equipment, the facility space, the manufacturing schedule and available capacity, operator training), and have a history of successful execution for other similar clients as a risk requirement.

1.12.4 Executive Dashboard for Viewing Content

The computer system can contain a dashboard for accessing and searching the database for global facilities capable of receiving the input container for the instructional blocks and transferring an inputted process to for the purposes of executing that process. From a user perspective this can be as simple as uploading or transferring from an integrated system (such as from a Document Management System) a file containing a batch record, augmented instruction, and/or instructional blocks into a system and then querying which sites uploaded into the network of facilities should be considered for the process, potentially including facilities external to the company. The computer system can then provide a ranked manifest list of the best fitting sites to transfer the process to, based on the searched requirements. This computer system search can take the bias out of selecting a suitable site for the process to be transferred to and base it on the facts of the secondary site to successfully manage the transferred process at the target costs, time, and risk reduction, instead of any potential institutional bias toward a particular site selection.

Out of the manifest list of facilities capable of receiving the process transfer a simple "one-click transfer" of a process or an input container containing the instructional blocks can then be performed for a facility from the manifest list to transfer a process to a selected facility meeting the target requirements for transferring the process to. For a simple transfer (involving no additional equipment orders, facility construction, or refurbishment), the receiving facility receives the transfer of a process or an input container containing the instructional blocks in the computer system the process can be automatically or manually scheduled, the equipment time reserved, the materials (raw materials, consumables) ordered, the operators messaged for additional training, and the facility work order for any process specific configurations is made. For more complicated transfers the specifications of the facility changes can be provided including the facility space requirements, the equipment needed to order, and any operator hiring required, along with a Gantt chart of the timelines needed to keep to the outlined process timelines. Additional approvals can be required through the computer systems as the management teams need to sign-off on each of the milestones within the process to get the facility ready for the process transfer.

An executive looking to make strategic decisions for which facilities to transfer products to for manufacturing, if there are one or more facilities in their current portfolio that best meets the search requirements based on the parameters provided, if a facility will require only minor changes or upgrades (such as equipment or personnel updates), if they will require major changes (such as facility construction, major expansion, or acquisition of a previous or new (Greenfield) facility), or if paying an external CMO is the target solution based on the highest priority requirements of reducing the level of risk for a process transfer, reducing the time required for a transfer (particularly if facility refurbishment, expansion, or construction is involved), or for performing the transfer for the cheapest upfront and continuing operations costs.

The model can also recommend splitting processes between facilities where a single facility does not have sufficient space, equipment, material, or operator expertise to directly transfer an entire process into, but that process can be split between multiple facilities where at an initial facility the material is processed to be an intermediate product, then transferred to a secondary facility for final processing, and potentially transferred to a third facility for final packaging and distribution. This would need to take into account fixed points in the process where the material is most stable and capable of being shipped, moved, or transferred between facilities taking into account travel time, cold chain requirements, and potential delays if transferring between facilities.

The computer system, the dashboard, and access to the remote access database can be a secure cloud database accessible by all users securely authorized to access and view the content globally.

1.13.5 Simulations of the Requirements

The computer system can provide simulations of the different requirements from the computer system searching the database to match the requirements of the procedures in the process transfer, the input container containing the instructional blocks, with the best fit for available facilities, facility layouts and features, compatible equipment types, qualified operators, and other factors. This can provide information about the existing company facilities, already in the computer system database as the Manufacturing Execution System (MES) can already manage the manufacturing at these facilities, and potential compare them to external CMO facilities with facility parameters, costs, and manufacturing schedules also available in the computer system. A CMO facility manifest list based on the capabilities of those facilities to receive the process transfer can be utilized in the case of a company without any current existing facilities.

Alternatively, models can be provided to compare new facilities (average cost of a new facility of a particular facility type in the set location), with expansion at an existing facility (cost per square foot or square meter of new construction) or retrofitting an existing facility space to accommodate the new process. Transferring a process to an existing CMO facilities with the proper facility features, equipment, operator expertise, and scheduling capacity can greatly save on the time to transfer and the time to begin manufacturing materials versus requiring construction for a new facility or for an existing facility. In addition, models can be provided that split a process to be transferred to multiple facilities where one facility can perform the first steps to a stable intermediate product, a second facility can provide the final product, and a third facility can provide the packaging and distribution.

Simulation models of the facilities can additionally include costs per unit for the transferred process, overall upfront costs, and regular operating costs based on labor costs in a certain region versus the risk scoring of transferring a process to a particular region. In these instances, the labor costs in some locations can be significantly lower but have a higher risk score since they lack the required infrastructure and skilled labor in that particular process area. Depending on the steps and equipment involved this separation of a process across multiple facilities can consist of internal, external, and partner companies for the target scheduling, costs, time, and risk reduction to a process.

The computer system can additionally have a set of industry standard pricing, construction times and costs, material lead times, and risk scoring for the different factors that go into the bringing a new process transfer into a facility. The computer system can provide an industry standard pricing (for new building construction, for facility expansion, for refurbishment), or for a new piece of equipment (such as a bioreactor, aseptic fill line, or isolator), or for the salary of an operator in a country with a specific level of expertise (such as in cell culture, protein purification, packaging, quality assurance). Alternatively, a user querying the data can manually change the input fields, if a factor is a known quantity for that particular facility, equipment, operator, to provide a better estimate of the factors involved such as costs, time, or risk.

1.14 Analogous Instructional Blocks

In one implementation, the computer system can: receive a selection to transfer a new digital procedure to a first facility within a network of manufacturing sites; in response to receiving the selection, access an instructional block library containing verified instructional blocks associated with approved procedures performed at the first facility; and identify an unverified instructional block, in a sequence of unverified instructional blocks, contained in the new digital procedure for staging at the first facility. Accordingly, the computer system can then: detect a set of manufacturing inputs in the unverified instructional block from the new digital procedure; and identify a verified instructional block contained in the set of verified instructional blocks as related (e.g., analogous) to the unverified instructional block based on the set of manufacturing inputs.

In one example, the computer system can: access a procedure library containing a suite of digital procedures currently performed at an initial facility in the network of manufacturing sites; and receive the selection, such as from an operator interfacing with the computer system at the initial facility and/or an operator device associated with the operator and connected to the computer system, to transfer a first digital procedure—in the suite of digital procedures contained in the procedure library—to the first facility in the network of manufacturing sites. Accordingly, the computer system can then initialize the first digital procedure as the new digital procedure for transfer to the first facility.

In another example, the computer system can: execute a software platform to display a virtual button (e.g., single button) at an interactive display associated to transfer of the new digital procedure to the first facility; and, in response to receiving selection of the virtual button (e.g., one-click) transfer the new digital procedure to the first facility and/or facilities in the network of manufacturing sites.

The computer system can then: detect a set of manufacturing inputs in the unverified instructional block corresponding to required inputs for executing the unverified instructional block such as, equipment unit requirements, operator profile requirements, environmental requirements, and time duration requirements; and identify the verified instructional block, in the set of verified instructional blocks, as analogous to the unverified instructional block in response to the verified instructional block approximating the set of manufacturing inputs contained in the unverified instructional block.

In one example, the computer system can: correlate a first equipment input (e.g., equipment unit type), in the first set of manufacturing inputs, with a first equipment unit (e.g., bio-reactor) located at the first facility; correlate a first action input (e.g., operator actions), in the first set of manufacturing inputs, with a first action prompt (e.g., bio-reactor loading) related to the first equipment unit; and correlate a first operator guidance input (e.g., text instruction format, visual instruction format), in the first set of manufacturing inputs, with a first operator profile—characterized by a guidance specification—associated with an operator at the first facility approved to interface with the first equipment unit. Accordingly, the computer system can then: identify the verified instructional block as analogous to the unverified instructional block in response to the verified instructional block including manufacturing inputs associated with the first equipment unit, the first action prompt, and the first operator profile; and, in response to identifying the verified instructional block, modify the new digital procedure to include the verified instructional block in place of the unverified instructional block for staging at the first facility.

Therefore, the computer system can then repeat the steps described above for a sequence of unverified instructional blocks contained in the new digital procedure in order to replace the sequence of unverified instructional blocks with verified instructional blocks from the instructional block library of the first facility. Thus, the computer system expedites staging of the new digital procedure by reducing requirement for extensive review (e.g., by a reviewer) of instructional blocks contained in the new digital procedure.

1.15 Analogous Instructional Block not Detected

In one implementation, the computer system can: access an unverified instructional block in the new digital procedure for staging at the first facility; detect a set of manufacturing inputs in the unverified instructional block; and identify absence of a verified instructional block, in the set of verified instructional blocks contained in the instructional block library, as analogous to the unverified instructional block based on the set of manufacturing inputs. In this implementation, the computer system can: conserve the unverified instructional block in the new digital procedure for transfer to the first facility; link the set of manufacturing inputs to global manufacturing inputs, such as defined in a global input manifest associated with the first facility; and flag the unverified instructional block, in the new digital procedure, for manual review by a reviewer overseeing digital procedures performed at the first facility.

In one example, in response to identifying absence of the verified instructional block in the instructional block library, the computer system can: initialize a draft instructional block based on the unverified instructional block; generate a prompt for the reviewer, overseeing digital procedures performed at the first facility, to modify parameters—corresponding to the set of manufacturing inputs—in the draft instructional block; and serve the prompt and the draft instructional block to a reviewer device associated with the reviewer. Accordingly, the computer system enables the reviewer to: link the set of manufacturing inputs required for the new digital procedure to manufacturing inputs from the global input manifest associated with the first facility; modify parameters (e.g., tolerances) corresponding to the manufacturing inputs in the draft instructional block; and approve the new digital procedure for staging at the first facility.

In another example, the computer system can: access an equipment manifest representing a corpus of equipment units currently deployed at the first facility; detect an equipment input, corresponding to an equipment unit type, in the set of manufacturing inputs from the unverified instructional block; query the equipment manifest to identify a set of equipment units located at the first facility corresponding to the equipment unit type of the equipment input; and identify an equipment unit of the equipment unit type (e.g., equivalent unit type), in the set of equipment units, based on the equipment unit approximating a target set of parameters for the equipment input in the unverified instructional block. Accordingly, the computer system can then: link the equipment unit to the draft instructional block in the new digital procedure; and serve the draft instructional block to the reviewer device for manual review.

In another example, the computer system can: access an operator manifest representing a corpus of operator profiles corresponding to operators performing approved digital procedures at the first facility; detect an operator profile input, corresponding to a target operator profile, in the set of manufacturing inputs from the unverified instructional block; query the operator manifest to identify a set of operator profiles representing operators located at the first facility and corresponding to the target operator profile of the operator profile input; and identify an operator profile, in the set of operator profiles, based on the operator profile approximating a target set of parameters for the operator profile input in the second unverified instructional block. Accordingly, the computer system can: link the operator profile to the draft instructional block in the new digital procedure; and serve the draft instructional block to the reviewer device for manual review.

Therefore, the computer system can: initialize a draft instructional block—including manufacturing inputs corresponding to available manufacturing inputs at the first facility—as an alternative instructional block for the unverified instructional block in the new digital procedure; and modify the draft instructional block (e.g., modify parameters) to approximate a verified instructional block at the first facility. Accordingly, the computer system can then insert the draft instructional block, in place of the unverified instructional block, in the new digital procedure.

1.16 Transfer Score

Blocks of the method S100 recite calculating a first transfer score for staging the new digital procedure at the first facility in Block S170 based on: a target set of parameters for the first set of manufacturing inputs in the first unverified instructional block; and a first set of parameters for the first set of manufacturing inputs in the first verified instructional block. Blocks of the method S100 also recite, in response to the first transfer score exceeding a threshold transfer score, inserting the first verified instructional block, in place of the first unverified instructional block, in the new digital procedure in Block S180. Generally, the computer system can calculate a transfer score proportional to a risk (e.g., fire exposure, hazard material exposure, batch yield output) for performing a particular instructional block—of a current digital procedure performed within a first facility—at a different facility (e.g., second facility) within the network of facilities. In particular, the computer system can: calculate a first order risk score based on differences between parameters of a set of manufacturing inputs in the transfer input container and target parameters for a set of manufacturing inputs of a particular digital procedure; and, in response to the first order risk score exceeding a threshold risk score, calculate a second order risk score based on difference between alternate parameters of a set of manufacturing inputs in the transfer input container and target parameters of the set of manufacturing inputs for a particular digital procedure. Thus, the computer system can: autonomously transfer the particular instructional block and the transfer input container to the different facility in the network of facilities responsive to a risk score falling below a risk score threshold; and/or flag instructional blocks and a corresponding input container responsive to a risk score exceeding a risk score threshold for additional review, such as by a remote viewer (e.g., remote operator) within the different facility.

1.16.1 Calculating Transfer Score

In one implementation, the computer system can calculate a transfer score: proportional to a risk (e.g., safety risk, time duration risk, financial risk) for staging the new digital procedure at the first facility; and based on deviations between a set of target parameters for manufacturing inputs contained in the unverified instructional block and a set of parameters for manufacturing inputs contained in the verified instructional block. For example, the computer system can detect deviations between: equipment unit types required for the unverified instructional block and available equipment unit types for the verified instructional block; a calibration status required for the unverified instructional block and a current calibration status for the available equipment unit types; a target time duration for performing the unverified instructional block and an estimated time duration for staging the verified instructional block; and/or a sanitation level required for performing the unverified instructional block by an operator and available sterilized locations for staging the verified instructional block at the first facility. Accordingly, the computer system can then: calculate the transfer score based on the deviations across parameters for manufacturing inputs in the unverified instructional block and parameters for manufacturing inputs in the verified instructional block; access a target threshold score, such as representing a minimum threshold score for staging the new digital procedure at the first facility; and, in response to the transfer score exceeding the threshold transfer score, modify the new digital procedure to replace the unverified instructional block with the verified instructional block associated with the first facility.

In one example, the computer system can calculate a transfer score proportional to a risk associated with equipment manufacturing inputs specified in the unverified instructional block. In this example, the computer system can: detect an equipment input, in the set of manufacturing inputs, corresponding to an equipment unit located at the first facility; and identify, in a set of parameters from the verified instructional block, an operating status representing an operating condition (e.g., in need of repair, currently operational) of the equipment unit, a model type (e.g., bio-reactor) for the equipment unit, and a calibration status representing a calibration condition of the equipment unit. Additionally, the computer system can: identify a target operating status, a target model type (e.g., equivalent model type), and a target calibration status, in the target set of parameters corresponding to the equipment input from the first unverified instructional block; and calculate the transfer score as exceeding the threshold transfer score in response to approximating the operating status to the target operating status, the model type to the target model type, and the calibration status to the target calibration status.

In another example, the computer system can calculate a transfer score representing a magnitude of risk associated with operator guidance inputs specified in the unverified instructional block. In this example, the computer system can: detect an operator guidance input, in the set of manufacturing inputs, corresponding to an operator profile associated with an operator at the first facility; identify, in the set of parameters from the verified instructional block, a minimum guidance specification (e.g., text format) of the operator profile; and a clearance specification (e.g., training clearance) of the of the operator profile. Additionally, the computer system can: identify a target guidance specification and a target clearance specification in the target set of parameters corresponding to the operator guidance input from the unverified instructional block; and calculate the transfer score as exceeding the threshold transfer score in response to approximating the minimum guidance specification to the target guidance specification and the clearance specification to the target clearance specification.

In yet another example, the computer system can calculate a transfer score representing a magnitude of risk associated with environmental inputs specified in the unverified instructional block. In this example, the computer system can: detect an environmental input, in the set of manufacturing inputs, corresponding to a region in a facility map representing the first facility; and identify, in the set of parameters from the verified instructional block, a classification status of the region (e.g., ISO class 8 cleanroom), a sanitation status of the region (e.g., sanitized zone), a climate status (e.g., temperature, humidity) of the region, and an area (e.g., 100 square feet) spanning the region. Additionally, the computer system can: identify a target classification status, a target sanitation status, a target climate status, and a target area, in the target set of parameters corresponding to the environmental input from the unverified instructional block; and calculate the transfer score as exceeding the threshold transfer score in response to approximating the classification status to the target classification status, the sanitation status to the target sanitation status, the climate status to the target climate status, and the area to the target area.

Accordingly, in response to the transfer score exceeding the threshold transfer score, the computer system can then: modify the new digital procedure to replace the unverified instructional block with the verified instructional block from the instructional block library; and autonomously approve the new digital procedure for staging at the first facility without manual review by the reviewer at the first facility. Therefore, the computer system can repeat the steps described above across a sequence of unverified instructional blocks contained in the new digital procedure in order to: replace the sequence of unverified instructional blocks with verified instructional blocks—from the instructional block library—in the new digital procedure; and stage the new digital procedure at the first facility without manual approval from a reviewer, such as by modifying a procedure schedule associated with the first facility to include the new digital procedure.

1.16.2 First-Order Transfer Risk

In one implementation, the computer system can: receive selection from an operator to transfer a particular digital procedure currently performed within a first facility—in a network of facilities—to a second facility in the network of facilities; for a particular instructional block in the particular digital procedure, generate a transfer input container representing a set of manufacturing inputs at the second facility analogous to manufacturing inputs of the particular digital procedure at the first facility; and calculate a first order risk score for performing the particular instructional block at the second facility based on differences in parameter values (e.g., facility classification, equipment types, equipment models, equipment equivalence, equipment unit settings, operator actions) of the set of manufacturing inputs in the transfer input container and baseline parameter values specified in the particular digital procedure. The computer system can then: identify a first order risk score that falls below a risk score threshold; transmit the particular instructional block and the transfer input container to a second computer system at the second facility; and schedule performance of the particular instructional block at the second facility within a network of facilities, such as by staging the particular instructional block within a procedure schedule for the second facility. Alternatively, the computer system can: identify a first order risk score that exceeds a risk score threshold; and flag the particular instructional block and the transfer input container for review by a supervising operator.

For example, the computer system can identify differences between: a first label (e.g., equipment unit model number) for a first equipment unit at the first facility and a second label for an analogous second equipment unit at the second facility; environmental conditions (e.g., room classification, HEPA air filtration, air flow rate and room changes, room temperature, ceiling height) for a first room at the first facility and an analogous second room at the second facility including the environmental conditions from the first room; and/or a first operator profile assigned to performance of the digital procedure at the first facility and a second operator profile—analogous to the first operator profile—assigned to a second operator within the second facility. The computer system can then: identify a first order risk score as falling below the threshold risk score responsive to identifying the analogous second equipment unit, the analogous second room, and the analogous second operator profile associated with the second facility; and verify the particular instructional block for performance at the second facility.

Therefore, the computer system can: schedule performance of the particular instructional block at the second facility and/or additional facilities within the network of facilities responsive to the first order risk score falling below the threshold risk score (i.e., the particular instructional block is safe to perform at the second facility); and/or modify parameters of the set of manufacturing inputs within the transfer input container to reduce the risk score responsive to the first order risk score exceeding the threshold risk score (i.e., high failure prediction for performing the particular instructional block at the second facility).

1.16.3 Manual Review+Parameter Modification

In one implementation, the computer system can: as described above, identify a verified instructional block, contained in the instructional block library, as analogous to the unverified instructional block in the new digital procedure; and, in response to the transfer score falling below the threshold transfer score, flag the new digital procedure for manual review by the reviewer at the first facility. In this implementation, the computer system can: access an unverified instructional block in the new digital procedure for staging at the first facility; detect a set of manufacturing inputs in the unverified instructional block; and identify a verified instructional block, in the set of verified instructional blocks contained in the instructional block library, as analogous to the unverified instructional block in response to the verified instructional block including the set of manufacturing inputs.

The computer system can then calculate a transfer score for staging the new digital procedure at the first facility based on: a target set of parameters for the set of manufacturing inputs in the unverified instructional block; and a set of parameters for the second set of manufacturing inputs in the second verified instructional block. Accordingly, in response to the transfer score falling below a threshold transfer score, the computer system can: insert the verified instructional block, in place of the unverified instructional block, in the new digital procedure; and flag the new digital procedure for manual review by a reviewer overseeing digital procedures performed at the first facility.

In response to the transfer score falling below the threshold transfer score, the computer system can: initialize a draft instructional block representing a modifiable instructional block based on the verified instructional block; identify a first parameter (e.g., equipment calibration)—in the second set of parameters from the second verified instructional block—exceeding a threshold deviation from a target parameter in the second target set of parameters from the second unverified instructional block; and modify the first parameter to the target parameter in the draft instructional block. The computer system can: adjust tolerances (e.g., tighten, widen) for parameters specified in the draft instructional block; schedule a calibration routine for a particular equipment unit; and/or identify available equipment units in the first facility for the new digital procedure. For example, in response to identifying a parameter exceeding a threshold deviation from a target parameter, the computer system can tighten a tolerance for the parameter in the draft instructional block. Alternatively, in response to identifying a parameter falling within a target range from the target parameter, the computer system can widen tolerance for the parameter in the draft instructional block.

Accordingly, the computer system can then: modify the new digital procedure to replace the unverified instructional block with the draft instructional block; and, in response to receiving approval from a reviewer at the first facility, schedule the new digital procedure for performance at the first facility.

In one example, the computer system can: detect an equipment input, in the set of manufacturing inputs, corresponding to an equipment unit located at the first facility; identify a calibration parameter of the equipment unit in a set of parameters from the verified instructional block; and detect a deviation between the calibration parameter of the equipment unit and a target calibration parameter in the target set of parameters from the unverified instructional block. The computer system can then, in response to the deviation exceeding a threshold deviation: calculate the transfer score as falling below the threshold transfer score; and modify the calibration parameter in the verified instructional block to the target calibration parameter. Accordingly, the computer system can: schedule the equipment unit for re-calibration; and/or identify alternative equipment units located at the first facility corresponding to the target calibration parameter.

In one implementation, the computer system can: initialize a draft instructional block based on the verified instructional block; identify a parameter (e.g., equipment input parameter), in the set of parameters, exceeding a threshold deviation from a target parameter in the target set of parameters; and generate a prompt for the reviewer to modify the parameter in the draft instructional block. The computer system can then: serve the prompt and the draft instructional block to a reviewer device associated with the reviewer; receive a modification (e.g., tolerance modification) to the parameter in the draft instructional block at the reviewer device; and, following approval from the reviewer, insert the draft instructional block, in place of the unverified instructional block, in the new digital procedure.

Therefore, the computer system can: repeat the steps described above to replace a sequence of unverified instructional blocks with verified instructional blocks—from the instructional block library—in the new digital procedure; calculate a transfer score for staging the new digital procedure at the first facility; and, in response to the transfer score falling below the threshold transfer score, modify parameters for manufacturing inputs in the verified instructional blocks to approximate target parameters specified in the unverified instructional blocks. Thus, the computer system can autonomously approve the new digital procedure for staging at the first facility with minimal review from a reviewer.

1.16.4 Second-Order Transfer Risk

In one implementation, the computer system can: identify a first order risk score exceeding the threshold risk score for performing a particular instructional block at a second facility in the network of facilities; responsive to identifying the first order risk score exceeding the threshold risk score, autonomously and/or manually modify parameters (e.g., modify equipment unit settings, environmental conditions) of a set of manufacturing inputs in a transfer input container for the particular instructional block; and calculate a second order risk score based on differences between alternative parameters of manufacturing inputs in the transfer input container and target parameters for manufacturing inputs of the particular instructional block. In this implementation, the computer system can then identify a second order risk score that falls below the threshold risk score and transfer, to a second facility in the network of facilities: the transfer input container containing alternative parameters for a set of manufacturing inputs within the transfer input container; and the particular instructional block selected for transfer to the second facility.

Alternatively, the computer system can: identify a second order risk score that exceeds the threshold risk score for transferring the particular instructional block to the second facility in the network of facilities; and flag the particular instructional block and the alternative transfer input container for additional review by a remote operator assigned to the second facility in the network of facilities.

For example, the computer system can: iteratively adjust parameters (e.g., modify combinations of equipment unit labels and/or operator profiles) for the set of manufacturing inputs in the transfer input container to achieve a second order risk score lower than the first order risk score; for each iteration of the parameters, calculate a second order risk score based on the alternative set of manufacturing inputs in the transfer input container and target parameters for the set of manufacturing inputs in the particular instructional block; and compile the calculated second order risk score for each iteration of the parameters into a ranked score list. In this example, the computer system can then: isolate a second transfer input container corresponding to a second order risk score falling below the threshold risk score in the ranked score list; and transfer this particular instructional block and the second transfer input container to the second facility in the network of facilities.

Thus, the computer system can: identify a particular instructional block—selected for transfer to a second facility—for a digital procedure currently performed in a first facility corresponding to a second order risk score falling below the threshold risk score; and autonomously schedule performance of this particular instructional block at the second facility within a network of facilities.

1.16.5 Transfer Review

In one implementation, the computer system can: identify a first order risk score or a second order risk score for transferring a particular instructional block to a second facility that exceeds a threshold risk score; and flag this particular instructional block and a corresponding transfer input container for additional review by a supervising operator. For example, the computer system can, in response to identifying a risk score that exceeds a risk score threshold: initialize an alternative instructional block for the particular instructional block that includes the transfer input container for performing the particular instructional block at the second facility; and generate a prompt for a remote operator to review the alternative instructional block in order to integrate the particular instructional block for performance at the second facility. In this example, the computer system can then: serve the prompt and the alternative instructional block to the remote operator, such as by rendering the alternative instructional block and the transfer input container at a mobile device associated with the remote operator; receive modifications for parameters of manufacturing inputs in the transfer input container by the remote operator at the mobile device; and receive selection of a label (e.g., approved for transfer) for the alternative instructional block and the transfer input container by the remote operator at the mobile device.

Therefore, the computer system can then: identify labels for alternative instructional blocks reviewed by a remote operator that have been approved for transfer to different facilities within the network of facilities; and transmit these alternative instructional blocks to a second computer systems within a second facility in the network of facilities in order to schedule performance of these alternative instructional blocks at the second facility.

1.16.6 Autonomous Digital Procedure Transfer

In one implementation, the computer system can: receive selection from an operator to transfer a particular digital procedure currently performed at a first facility to a second facility in the network of facilities; identify the risk, time, financial, or other scoring type for each instructional block in the digital procedure as falling below a threshold score; transfer the digital procedure to a second computer system in the second facility; and schedule performance of the digital procedure at the second facility, such as by modifying a procedure schedule assigned to the second facility.

In another implementation, the computer system can transmit instructional blocks of the digital procedure to one or more facilities in the network of facilities. In this implementation, the computer system can: receive selection from an operator to transfer a particular digital procedure currently performed at a first facility to a set of facilities within the network of facilities; identify a first set of instructional blocks in the digital procedure corresponding to a first score falling below the threshold score for performing the first set of instructional blocks at a first facility; and transfer the first set of instructional blocks in the digital procedure to a first computer system in the first facility in a network of facilities. Additionally, the computer system can: identify a second set of instructional blocks in the digital procedure corresponding to a second score falling below the threshold score for performing the second set of instructional blocks at a second facility; and transfer the second set of instructional blocks in the digital procedure to a second computer system in the second facility in the network of facilities. Thus, the computer system can schedule performance of the digital procedure across the first facility and the second facility, such as by modifying a procedure schedule assigned to the first facility and the second facility.

1.16.7 New Procedure Staging

In one implementation, the computer system can: access the new digital procedure for staging at the first facility; access a procedure schedule corresponding to procedures scheduled for performance at the first facility; and insert the new digital procedure within a time block in the procedure schedule. Additionally, in response to inserting the new digital procedure within the time block, the computer system can implement artificial intelligence (e.g., machine learning, regression) techniques to autonomously: order equipment units and supplies necessary to perform the new digital procedure at the first facility; schedule training sessions for operators at the first facility assigned to perform the new digital procedure; and generate milestone dates for performance of the new digital procedure at the first facility. Therefore, the computer system can autonomously stage the new digital procedure for performance at the first facility.

1.17 Artificial Intelligence Integration

In one implementation, the computer system can implement artificial intelligence (e.g., machine learning, regression) techniques, such as described in U.S. Provisional Application No. 63/522,840, filed on 23 Jul. 2023, and 63/522,843, filed on 23 Jul. 2023, each of which are incorporated in its entirety by this reference, to autonomously generate a new set of verified instructional blocks to replace the sequence of unverified instructional blocks in the new digital procedure. In particular, the computer system can: access a procedure authoring model representing combinations of language signals characteristic of procedure conventions for verified instructional blocks associated with the first facility; and, based on the procedure authoring model and the sequence of unverified instructional blocks, generate a new set of instructional blocks characteristic of procedure conventions across the first facility. The computer system can then: modify the new digital procedure to replace the sequence of unverified instructional blocks in the new digital procedure with the new set of instructional blocks characteristic of the procedure conventions across the first facility; and autonomously stage the new digital procedure at the first facility, such as by modifying a procedure schedule at the first facility to include the new digital procedure.

2. Second Method: Predicting Batch Yield

Figure 3:
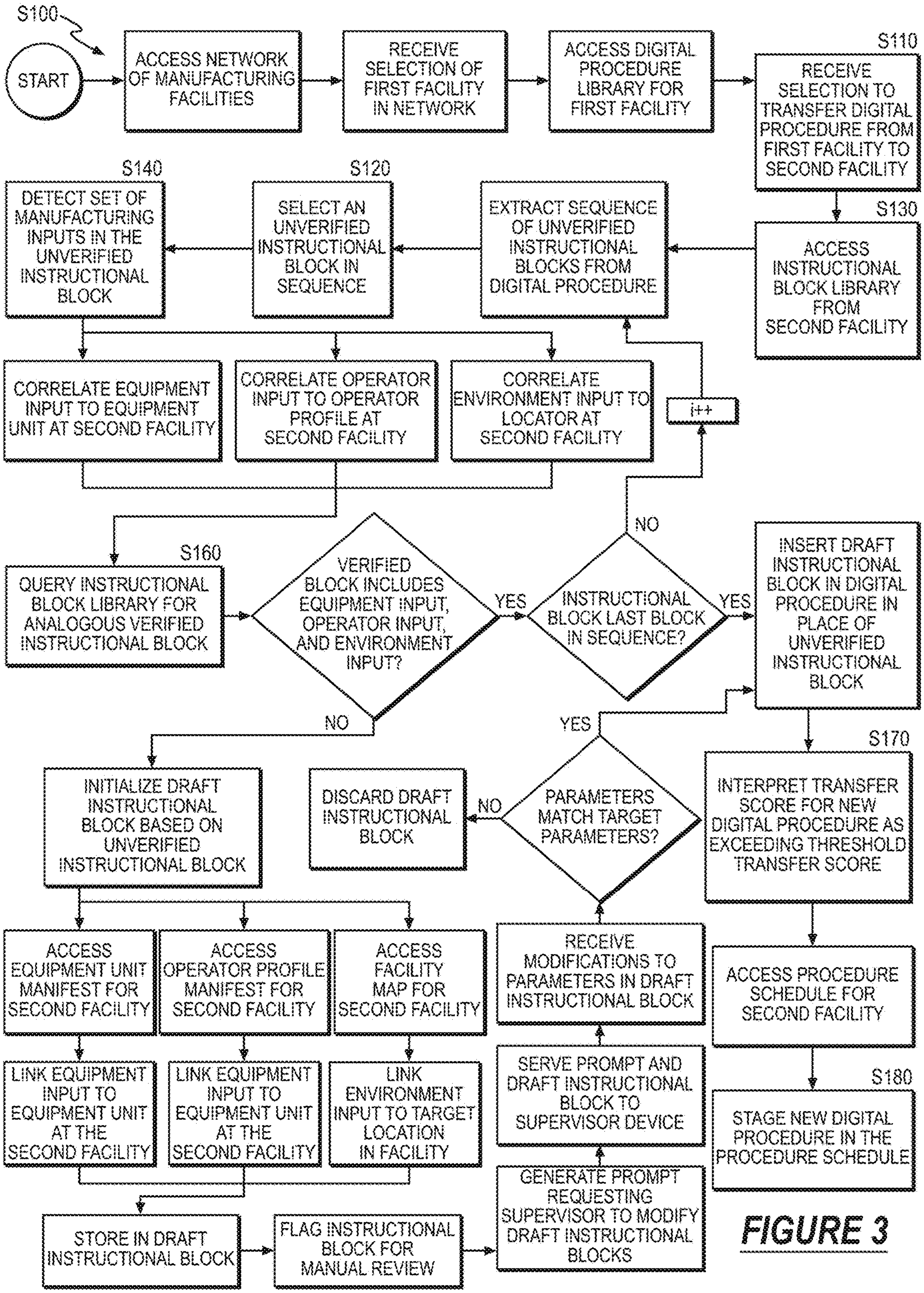
FIG. 3 is a flowchart representation of the first method.
Figure 4:
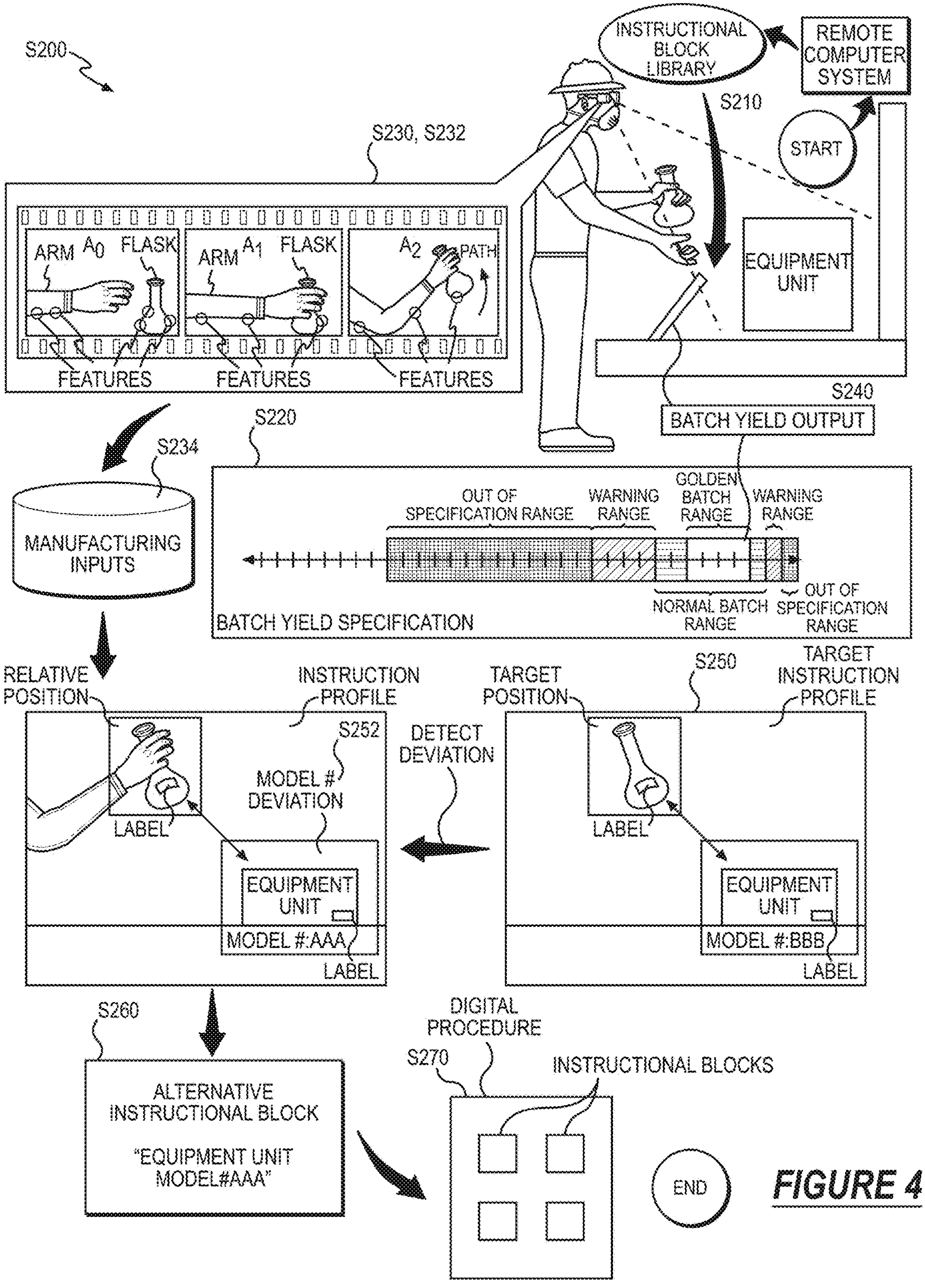
FIG. 4 is a flowchart representation of a second method.
Figure 5:
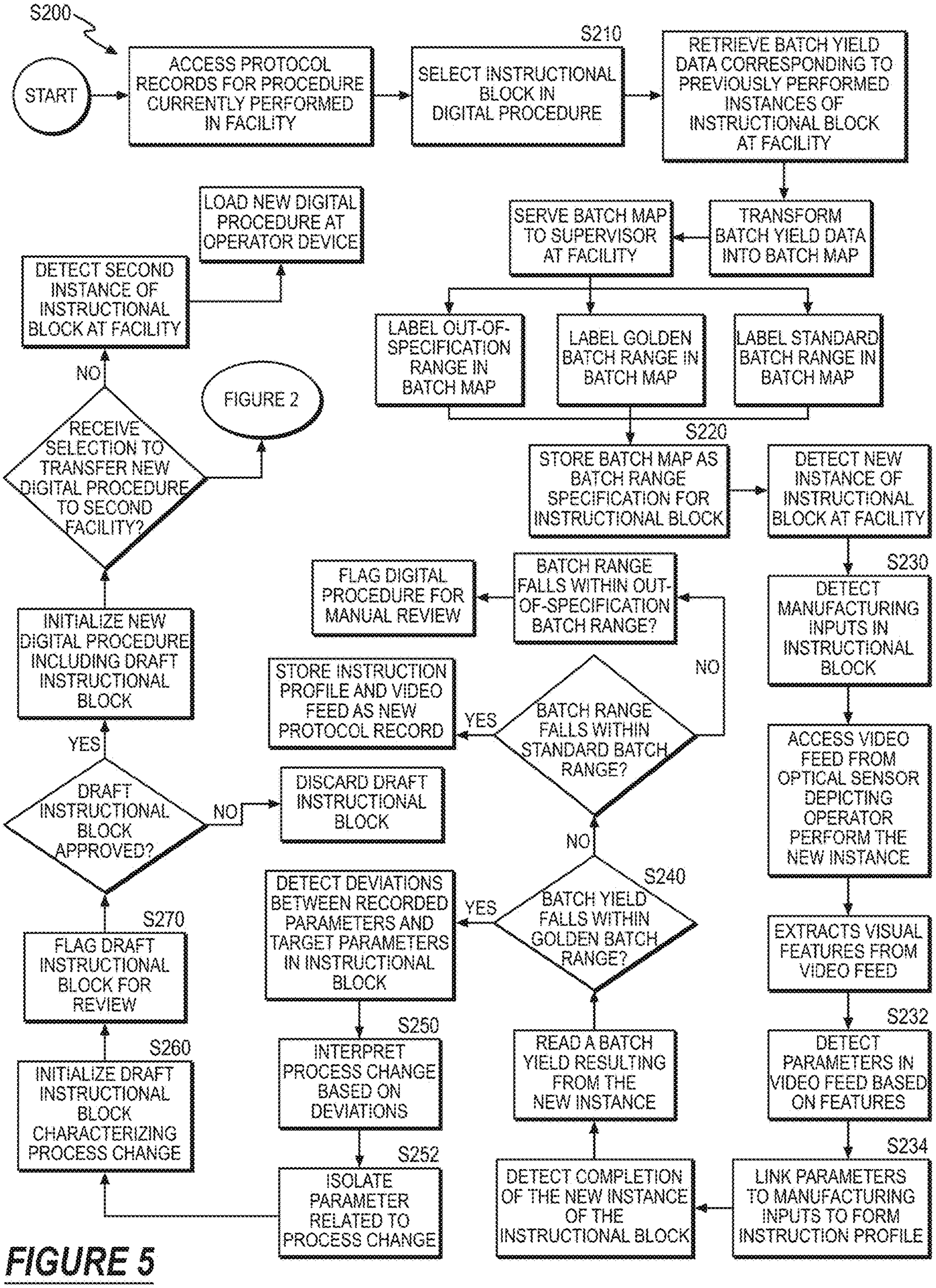
FIG. 5 is a flowchart representation of the second method.
Figure 6:
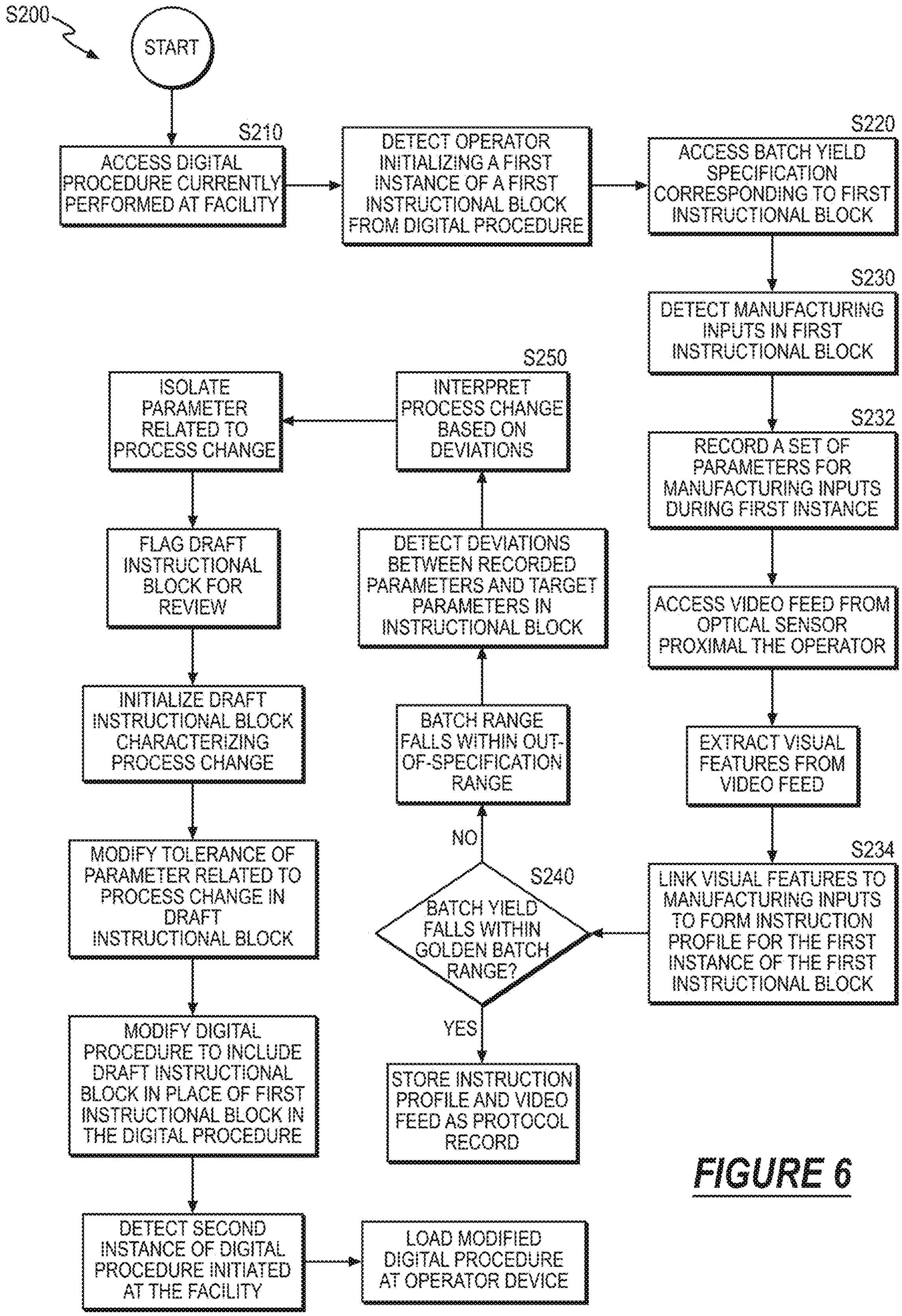
FIG. 6 is a flowchart representation of the second method.

As shown in FIG. 3, a method S100 for predicting batch yield for a manufacturing process includes: accessing a first digital procedure containing a first verified instructional block, in a sequence of instructional blocks, currently performed at a first facility in Block S210; and accessing a batch range specification associated with the first verified instructional block and defining a set of batch ranges for characterizing batch output upon completion of a performed instance of the first verified instructional block in Block S220.

The method S200 further includes, in response to an operator initiating a first instance of the first verified instructional block: detecting a first set of manufacturing inputs in the first verified instructional block in Block S230; recording a first set of parameters corresponding to the first set of manufacturing inputs during performance of the first verified instructional block by the operator in Block S232; and linking the first set of parameters to the first set of manufacturing inputs to generate a first instruction profile representative of the first instance of the first verified instructional block in Block S234.

The method S200 also includes, following completion of the first instance of the first verified instructional block by the operator: identifying a first batch yield of the first instance of the first verified instructional block as corresponding to a target batch range in the set of batch ranges in Block S240; interpreting a process change resulting in the first batch yield based on the first set of parameters of the first instruction profile and a target set of parameters of the first verified instructional block in Block S250; and isolating a first parameter, in the set of parameters, associated with the process change in Block S252.

The method S200 further includes: initializing an unverified draft instructional block characterizing the process change based on the first verified instructional block and the first parameter in Block S260; and flagging the unverified draft instructional block for manual review by a reviewer overseeing digital procedures performed at the first facility in Block S270.

2.1 Applications

Generally, a computer system (e.g., a computer network) can execute Blocks of the method S100: to modify existing digital procedures defining processes currently performed within a facility containing non-networked manufacturing equipment; and/or to generate new digital procedures representing new processes and/or variations of existing processes derived from these existing digital procedures. In particular, the computer system can: compile completed instances of steps in the digital procedure in the facility containing batch yields (e.g., batch quantity, batch quality, batch activity, batch release testing results) that fall within a target batch range (or "golden batch") specified for performed steps of the digital procedure; isolate non-visual manufacturing features (e.g., conditions, ranges, material specifications, unit operations, parameters, performed steps) representing manufacturing inputs from these completed instances of steps of the digital procedure that are a process change from the standard target non-visual manufacturing features specified in the digital procedure; and modify subsequent instances of the digital procedure performed in the facility to include these isolated non-visual manufacturing features (e.g., conditions, ranges, material specification, unit operations, parameters, performed steps) that resulted in the batch yield exceeding the standard, expected, normal distribution range and falling within the higher yield of a golden batch range. Thus, the computer system can repeat this process in order to increase consistency of batch yields and approach a "golden batch range" for subsequent instances of the digital procedure performed within the facility and/or within other remote facilities.

For example, during performance of a current instance of a particular instruction in the digital procedure by an operator, the computer system can: access an instruction video feed from an optical sensor proximal the operator (e.g., fixed camera, autonomous mobile camera, headset device) depicting performance of the particular instruction; implement computer vision techniques (e.g., edge detection, blob extraction, template matching) to extract visual features from the instruction video feed; and identify objects (e.g., equipment units, operator pose) associated with performance of the particular instruction of the digital procedure based on these extracted visual features.

Subsequently, the computer system can: access a set of manufacturing inputs [e.g., consumable product and batch numbers, raw material lot numbers, material specifications, equipment parameters, operational timing between steps, operational speeds (impeller mixing, flow rates), recorded sensor data (temperature, pressure, gas control values) by the operator during performance of the particular instruction; link the manufacturing inputs to the objects identified in the instruction video feed related to performance of the particular instruction, such as linking material specs to particular equipment units, and linking performed unit operations to the operator; and generate an instruction profile representing performance of the current instance of the particular instruction in the digital procedure based on the linked manufacturing inputs and the objects related to performance of the particular instruction.

In this example, upon completion of the current instance of the particular instruction in the digital procedure by the operator, the computer system can: identify a batch yield of this completed instance of the particular instructional block as corresponding to a golden batch yield; interpret the process change, series of process changes, cascade of process changes, or constellation of changes during the processing [e.g., changes in the environment conditions (time, temperature, gas flow rates), material specs (consumables, raw materials, equipment types), and parameters (specifications for collected data)] between the instruction profile and a target instruction profile representing ideal performance the particular instruction; and isolate a particular non-visual manufacturing input associated with the process change (e.g., equipment unit parameter) and resulting in the batch yield corresponding to a configured golden batch yield.

Therefore, the computer system can: initialize an alternative instructional block containing an alternative instruction, different from the performed instruction, that specifies the isolated particular non-visual manufacturing input; and modify subsequent instances of the digital procedure performed in the digital procedure to replace the previous particular instruction with the alternative instruction in order to achieve golden batch yields that fall within the golden batch range for these subsequent instances of the digital procedure performed within the facility.

2.1.1 Example: Golden Batch Configuration

Golden batch configuration corresponds to a statistical process control (SPC) technique used in the manufacturing industry to configure the production process. The goal of golden batch configuration is to identify the best set of process parameters (i.e., the "golden batch") that results in the production of highest yield of a product(s) containing the highest quality, consistent with tested quality characteristics specifications. The process of golden batch configuration begins with the collection of process data from multiple production runs. This data is analyzed using statistical tools to identify the relationships between process parameters and product quality characteristics. The target process parameters are then identified and validated through additional production runs to confirm that they result in consistent product quality. Once the golden batch parameters have been identified, they can be used as the standard for future production runs. This helps ensure the configured yields with consistent product quality and reduces the risk of defects or variability in the final product.

For example, golden batches for a cell culture process in a bioreactor can be identified using a statistical process control (SPC) approach, similar to other manufacturing processes. Data collection: collect data from multiple production runs, including process parameters (e.g., temperature, pH, dissolved oxygen, agitation/mixer speed) and product quality characteristics (e.g. cell viability, cell density, product concentration). Statistical analysis: analyze the collected data using statistical tools, such as regression analysis, correlation analysis, and multivariate analysis, to identify the relationships between the process parameters and the product quality characteristics. Identification of target parameters: based on the statistical analysis, identify the set of process parameters that result in the highest product quality. This set of parameters is referred to as the "golden batch." Validation: validate the golden batch parameters through additional production runs to confirm that they result in consistent product quality. This can involve running pilot-scale bioreactor experiments to confirm the results of the statistical analysis. Implementation: once the golden batch parameters have been validated, they can be used as the standard for future production runs. The process should be regularly monitored, and the golden batch parameters re-evaluated as necessary if changes in the manufacturing process or product specifications occur.

Cell culture processes in a bioreactor can be complex and affected by a variety of factors, such as the type of cells being cultured, the media used, and the environmental conditions in the bioreactor. As a result, the golden batch parameters can vary from one production run to another and can need to be re-configured periodically to ensure that the process remains under control and produces high-quality products. The conditions used in measuring golden batches from a cell culture process using a single-use bioreactor, which utilizes a plastic film material as a vessel to hold the cell culture fluid for growing the cells, can be influenced by various factors, including process conditions such as temperature, gas distribution, and pH, as well as the components and film layers used in the process which can affect cell growth under different process conditions.

Process conditions, such as temperature, gas distribution, and pH, play a critical role in the growth and viability of cells in a bioreactor culture. These conditions must be controlled and maintained within a specific range to ensure target cell growth and product quality. The model of the bioreactor, the cell culture media, the single-use film type for bags, the single-use filter materials, and the tubing materials are all components of the process that can also impact the growth and viability of cells in the bioreactor. These components can affect the oxygen transfer rate, nutrient availability, or extractables and leachables which can inhibit cell growth and other factors that can impact cell growth and product quality.

When measuring golden batches for a cell culture process using a single-use bioreactor, it is important to consider both the process conditions and the components used in the process. In some cases, different components can be used in the same process to configure the conditions for cell growth and product quality. For example, different types of cell culture media or single-use film types or even the batches or lots of these materials can be used to configure the growth and viability of different cell types or in the case of single-use film types the product contact film layer does not negatively affect the growth of the cells, resulting in an increase of batch yields. It is important to consider the interplay between the process conditions and components used in the process when measuring golden batches to ensure that the process produces high-quality products consistently.

To achieve golden batch configuration of yields in complex pharmaceutical manufacturing processes, statistical process controls (SPC) can be used to monitor and control the process variables. Statistical process controls are a set of statistical techniques that are used to analyze and control the variation in a process, with the goal of producing higher yields with consistent, high-quality products.

To get a handle on the many possible variables in a complex manufacturing process, such as the measured conditions, process settings, equipment used, consumables used, raw materials used, and operator experience levels, a thorough understanding of the process and all its inputs and outputs is required. This involves the computer system identifying and documenting all of the process variables and inputs with understanding how they are interrelated and how they can impact the final product.

Once the process variables have been identified, the computer system can use statistical process controls techniques to monitor, control, and recommend improvement to configure the process. This involves collecting data on the key process variables, such as temperature, pH, mixer speed, aeration flow rate, gas values, and other relevant factors, and analyzing the data to identify any trends or patterns that can indicate a problem in the process. Control charts, statistical process capability analysis, and other statistical techniques can be used by the computer system to monitor the process and identify areas for improvement.

By identifying the key process variables for statistical process controls the computer system can observe process variables that cause the batch yields and batch quality to increase or decrease for the batches that are recorded. The computer system can identify patterns, such as if the temperature increases to a certain specification, then the batch yields go up, but at a certain level the quality begins to decrease, and at even higher temperatures the batch yields begin to decrease. The individual process variables themselves can not affect the batch yields or product quality directly but can require a series of process changes, a cascade of process changes, or a constellation of changes during the processing to cause a measurable effect on the batch yields or product quality.

Most manufacturing processes contain hundreds to thousands of process variables where the process was scaled-up from a bench-top process to a large-scale manufacturing process without a long history of product development taking place. Most of this can have been carried out using paper batch records so the data for batch analysis can not be readily available or easily accessible to insert into a statistical process analysis model where the key process parameters could be identified. In most processes there are too many process variables to be able to make sense out of all of the conditions to create a golden batch and configure (e.g., target configuration) the process.

It is possible that the scaled-up process parameters used conservative limits or specifications during the tech transfer to a production manufacturing without a complete understanding of all of the key process variables that can affect the batch yields and product quality. In this case the specifications and the golden batch configuration can only take place after a sufficient number of production manufacturing runs have been completed to analyze the data where a computer system can provide further analysis to make recommendations on process variables for the configuration of a manufacturing process which can provide increased product yields, increased quality, and security of supply. It can also be slight differences between operators, or materials, or sites performing the manufacturing on different equipment that can provide the variability of the process parameters resulting in the recognition of differences in the yields based on changes in the process parameters which can lead to a greater understanding of the process resulting in the conditions for producing golden batch yield.

For multi-enterprise organizations the different manufacturing sites (or even different teams or manufacturing shifts) can be producing the same product with varying equipment, consumables, environmental conditions, operator expertise, and process parameters. This can provide the information needed to determine why one site is getting higher batch yields and product quality over another site which would qualify for identifying specific batch runs as a golden batch designation. The computer system can also take information from small scale testing for the process parameters such as with arrays of microbioreactors or chromatography systems testing different process parameters under different conditions to determine the key process parameters for the configuration (e.g., golden batch configuration) of a process and providing golden batches at the production manufacturing scale.

The computer system can analyze these variables using statistical process controls and then make recommendations to the other sites to improve those sites to also achieve golden batches in their production of the product. This can be through the automated updating of the process parameters, the parameter settings, the instructional blocks for the operators to follow, the components they are using, or the equipment they use. The computer system can additionally provide simulations for the return on investment if raw materials, consumables, or equipment needs to be purchased to achieve the golden batches with higher yields and what will be the time period for return on investment expected for a process if they follow the processing workflow from an alternate facility achieving golden batches in the multi-enterprise system.

The computer system can also recommend alternative contract manufacturing organizations (CMOs) inside the database which contain the same equipment and can have the manufacturing processes transferred to those sites as a cheaper alternative to investing in the manufacturing upgrades required for a site.

2.2 Batch Range Specification

Blocks of the method S200 recite: accessing a first digital procedure containing a first verified instructional block, in a sequence of instructional blocks, currently performed at a first facility in Block S210; and accessing a batch range specification associated with the first verified instructional block and defining a set of batch ranges for characterizing batch output upon completion of a performed instance of the first verified instructional block in Block S220.

Generally, the computer system can: retrieve a set of records of previously performed instances of the digital procedure (e.g., steps, sub-steps of the procedure) within the facility and/or remote facilities that performed steps of the digital procedure; extract a batch yield output (e.g., batch quantity, batch quality) for each record, in the set of records, for the performed instances of the digital procedure; compile the batch yield output for each record into a set of batch yield data representing total batch yield output for facilities performing the digital procedure; and generate a batch yield specification for the digital procedure defining a set of batch ranges for completed instances of the digital procedure based on the compiled yield output. In particular, the computer system can generate a batch yield specification that defines: a standard batch range representing an acceptable batch yield of a performed digital procedure; a golden batch range within the standard batch range representing ideal (e.g., target quantity, target quality) batch yield of a performed digital procedure; an out-of-specification batch range that falls out of the standard batch range that represents a defective batch yield of a performed digital procedure; and a warning batch range within the standard batch range representing an acceptable batch yield of a performed digital procedure proximal the out-of-specification batch range.

The computer system can then: store the batch yield specification in a batch yield database of the computer system; and/or transmit the batch yield specification to computer systems at remote manufacturing sites that carry out steps of the digital procedure.

2.2.1 Manual Batch Range Labeling

In one implementation, the computer system can: retrieve a set of batch yield data (e.g., from a record database) for performed instances of the digital procedure within the facility; serve the batch yield data to a remote viewer portal (e.g., a graph format, chart format, map format) associated with a supervising operator overseeing performance of the digital procedure within the facility; receive a set of labels from the supervising operator at the remote viewer portal corresponding to the set of batch ranges of the digital procedure; and generate the batch yield specification based on the retrieved set of batch yield data and the set of labels received from the supervising operator.

In one example, the computer system can: generate a batch map (e.g., linear yield map) plotting the set of batch yield data representing the total batch yield output for a particular instructional block in the digital procedure; and serve the batch map to a supervising operator overseeing performance of the digital procedure within the facility, such as to a remote viewer portal on a mobile device associated with the supervising operator. In this example, the remote viewer portal on the mobile device can: receive a set of labels for the batch map—from the supervising operator at the mobile device—representing the set of batch ranges (i.e., standard batch range, golden batch range, out-of-specification batch range, and the warning batch range) for the digital procedure; transmit the labeled batch map to the computer system; and store the labeled batch map as the batch yield specification for the digital procedure at the computer system.

Therefore, the computer system can: retrieve the batch yield specification for a current instance of a particular instructional block—in the digital procedure—following completion of the particular instructional block by the operator; and identify a particular batch range for a current batch yield of the current instance of the performed instructional block according to the batch yield specification.

2.2.2 Autonomous Batch Range Labeling

In another implementation, the computer system can: retrieve a set of batch yield data (e.g., from a record database) for performed instances of the digital procedure within the facility; extract a target batch yield value from a particular instructional block in the digital procedure representing a desired batch output from the particular instructional block in the digital procedure; autonomously group sub-sets of batch yield data in the set of batch yield data with a process change (e.g., deviation)—from a threshold of process changes—from the target batch yield value; autonomously label the grouped subsets of batch yield data, such as based on a batch yield quantity (e.g., 100 grams, 10 liters) and/or batch yield quality (e.g., pH value, temperature, visual characteristics, dissolution testing, release testing); and generate the batch yield specification based on the labeled sub-sets of batch yield data.

For example, the computer system can: retrieve the batch map representing batch yield for performed instances of a particular instructional block in the digital procedure; extract a target batch yield value for a particular instructional block specified in the digital procedure; and extract a threshold batch yield value for the particular instructional block specified in the digital procedure. In this example, the computer system can then: generate a first set of bounding boxes on the batch map corresponding to accepted batch yields for the performed instances of the particular instructional block based on the target batch yield value and the threshold batch yield value; generate a second set of bounding boxes proximal the first set of bounding boxes on the batch map representing defective batch yields based on the defined threshold batch yield value; and store the batch map as the batch yield specification in the particular instructional block in the digital procedure.

Therefore, the computer system can: track changes in batch yield ranges of a performed digital procedure within the facility over a particular time period (e.g., one week, one month, every quarter); and modify instructional blocks in the digital procedure according to a current (e.g., within the past week, month) batch yield range for the digital procedure.

2.2.3 Example: Facility Reviewer

In one implementation, the computer system can: access a set of batch yield data corresponding to previously performed instances of the digital procedure within the first facility; transform the batch yield data into a batch map representing batch yield output from the batch yield data as a function of previously performed instances of the verified instructional block of the digital procedure; and serve the batch map to a reviewer device associated with the reviewer overseeing performance of the first digital procedure at the first facility. The computer system can then, via the reviewer device, receive a set of labels for the batch map corresponding to the set of batch ranges. In this implementation, the set of labels can include: a standard batch range representing a tolerable batch yield quantity for previously performed instances of the verified instructional block; the target batch range, within the standard batch range, representing a target batch yield quantity for previously performed instances of the verified instructional block; and an out-of-specification range, different from the standard batch range, representing an intolerable batch yield quantity for previously performed instances of the verified instructional block. Therefore, the computer system can: store the batch map including the set of labels as the batch range specification corresponding to the verified instructional block of the digital procedure; and update the batch map following completed instances of the verified instructional block from the digital procedure in the first facility.

2.2 Instruction Profile

Blocks of the method S200 recite: detecting a first set of manufacturing inputs in the first verified instructional block in Block S230; recording a first set of parameters corresponding to the first set of manufacturing inputs during performance of the first verified instructional block by the operator in Block S232; and linking the first set of parameters to the first set of manufacturing inputs to generate a first instruction profile representative of the first instance of the first verified instructional block in Block S234. Generally, the computer system can: access an instruction video feed and/or sets of instruction video feeds from an optical sensor (e.g., fixed camera, autonomous cart camera, headset camera) arranged proximal the operator performing instructional blocks of the digital procedure; generate an instruction profile representing performance of an instance (e.g., step, sub-step) of the digital procedure by the operator based on features extracted from the instruction video feed during performance of the digital procedure; and interpret process changes (e.g., environment conditions, operator actions, equipment unit parameters) between the generated instruction profile and a target instruction profile representing an ideal performance of the digital procedure.

In particular, the computer system can: access a set of non-visual features representing a set of manufacturing inputs during performance of a particular instruction of a particular instructional block; extract a set of visual features from the instruction video feed depicting performance of the particular instruction; link the set non-visual features to the set of visual features extracted from the instruction video feed, such as by linking a particular set of input parameters to a particular equipment unit handled by the operator; and generate the instruction profile based on a linked set of non-visual features and visual features for a performed instance of the particular instruction of the particular instructional block. Thus, the computer system can: interpret a process change, exceeding a threshold process change, between the generated instruction profile and the target instruction profile; and isolate a particular feature in the linked set of non-visual features and visual features predicted to produce the process change.

2.2.1 Instruction Video Feed

Generally, in this variation of the method S100, the computer system accesses video feeds recorded by an optical sensor during performance of the digital procedure.

In one implementation, the computer system can retrieve instruction video feeds directly from an optical sensor, such as located at the mobile device of the operator, in real-time during performance of the digital procedure in response to initiating the first instructional block in the digital procedure. Additionally or alternatively the computer system can retrieve instruction video feeds recorded by the optical sensor, uploaded from the optical sensor to a file system via a computer network, and stored in an instruction video database. In this implementation, the computer system can retrieve the instruction video in a particular video format, such as a continuous video stream depicting the operator performing instructional blocks of the digital procedure; and/or individualized video clips, each depicting performance of a particular instructional block in the digital procedure. Additionally, the instruction video feed can be captured from the optical sensor, such as during performance of the digital procedure at the facility, during testing of instructional blocks at a test facility, and/or during a calibration routine. In one variation of this implementation, multiple optical sensors can be utilized where the computer system records multiple angles and views of the same event and the platform can build an instructional block consisting of one or multiple sensor devices. The target video resolutions, distance, angles, and relevance to the procedure steps can be selected as the primary content of the instructional block that the operator is able to view when linked to a step, where the other content is either available within the instructional block, linked to the instructional block, or deleted.

In this implementation, the mobile device can include: a visible light camera (e.g., a RGB CMOS, or black and white CCD camera) that captures instruction video feeds (e.g., digital color video feeds) of an operator located at an operator cell within the facility performing instructional blocks of the digital procedure; and a data bus that offloads instruction video feeds, such as to a local or remote database. The mobile device associated with the operator can additionally or alternatively include multiple visible light cameras, one or more infrared cameras, thermal imaging cameras.

In one example, upon receipt or retrieval of an instruction video feed, the computer system can: implement computer vision techniques (e.g., object recognition, edge detection) to identify objects—such as hands of operators and equipment units—depicted in the instruction video feed to identify a perimeter or boundary of the these objects; and crop the instruction video feed around these objects such that only features corresponding to these objects are extracted from the instruction video feed. The computer system can thus, aggregate instruction video feeds for instructional blocks of a digital procedure performed within the facility, wherein each instruction video feed captures visual characteristics of a unique performance of an instructional block in a digital procedure.

Therefore, the computer system can: access an instruction video feed depicting performance of a modifiable digital procedure in preparation to extract features from the instruction video feed depicting the operator performing instructions deviating from instructional blocks of a current instance of the digital procedure.

In another implementation, the computer system can access a combination of instruction video feeds and instruction images recorded during performance of the digital procedure. In one example, the computer system can extract instruction images from instruction video feeds by identifying video frames (i.e., static images extracted from the video feed) in the instruction video feeds corresponding to performance of particular instructional blocks in a digital procedure.

2.2.2 Generating Instruction Profile

Generally, the computer system can: identify multiple (e.g., "n" or "many") features representative of performance of the digital procedure in an instruction video feed; characterize these features over a duration of the instruction video feed, such as over a duration corresponding to performance of an instruction video feed in the digital procedure; and aggregate these features into a multi-dimensional feature profile uniquely representing performance of this digital procedure, such as duration of time periods, relative orientations, geometries, relative velocities, lengths, angles, of these features.

In one implementation, the computer system can implement an instruction feature classifier that defines types of instruction features (e.g., corners, edges, areas, gradients, orientations, strength of a blob), relative positions and orientations of multiple instruction features, and/or prioritization for detecting and extracting these instruction features from the instruction video feed. In this implementation, the computer system can implement: low-level computer vision techniques (e.g., edge detection, ridge detection); curvature-based computer vision techniques (e.g., changing intensity, autocorrelation); and/or shape based computer vision techniques (e.g., thresholding, blob extraction, template matching) according the instruction feature classifier in order to detect instruction features representing performance of the digital procedure in the instruction video feed. The computer system can then generate a multi-dimensional (e.g., n-dimensional) instruction feature profile representing multiple features extracted for a duration in the instruction video feed.

In one example, the computer system can: in response to initialization of a first instructional block in a modifiable digital procedure retrieved by a mobile device associated with the operator, generate a prompt to the operator to record performance of the first instructional block; access an instruction video feed captured by an optical sensor, such as coupled to an augmented reality headset, as described above, depicting performance of this first instructional block; and extract a set of features from the instruction video feed. The computer system can then: identify a set of objects in the instruction video feed based on the set of features, such as hands of an operator, equipment units handled by the operator during performance of the first instructional block, a string of values on a display of an equipment unit; and generate an instruction profile for the first instructional block including the set of objects identified in the instruction video feed. Additionally or alternatively, the computer system can, via the operator device associated with the operator: receive a particular value presented at the first equipment unit from the operator; receive a guidance specification corresponding to the action prompt from the operator; and receive a temperature value corresponding to the first location from the operator.

Therefore, the computer system can: identify objects in instruction video feeds associated with performance of instructional blocks in the digital procedure; represent these objects in an instruction profile; and confirm presence of pertinent objects necessary for performing the digital procedure based on the instruction profile.

In another implementation, the computer system can further interpret actions carried out by an operator during performance of instructional blocks of the digital procedure based on the set of features extracted from the instruction video feed. In one example of this implementation, the computer system can: identify a first object (e.g., a flask) in the instruction video feed associated with performance of the first instructional block in the digital procedure; identify a second object (e.g., hand of an operator handling the first object and/or equipment units) in the instruction video feed associated with performance of the first instructional block in the digital procedure; and track relative positions, paths, and velocities of these objects for a duration in the instruction video feed corresponding to performance of the first instructional block. The computer system can then implement template matching techniques for these relative positions, paths, velocities of these objects in order to identify actions performed by the operator in the instruction video feed (e.g., filling the flask with a liquid substance). The computer system can then generate the instruction profile including the first object, the second object, and motion (e.g., velocities, path, location) of these objects during performance of the digital procedure.

Therefore, the computer system can: interpret actions carried out by operators depicted in the instruction video feed; represent these actions in an instruction profile for instructional blocks of the digital procedure; and confirm presence of actions necessary for performing instructional blocks of the digital procedure based on the instruction profile.

2.3.2.1 Linking Manufacturing Inputs

In one implementation, the computer system can: receive a set of manufacturing inputs (e.g., equipment unit settings, material types, material measurements, equipment data, sensor data) from an operator during performance of a particular instruction of a particular instructional block; and store this set of manufacturing inputs as a set of non-visual features in the generated instruction profile for a performed instance of a particular instructional block within a digital procedure. In this implementation, the computer system can: generate a prompt to an operator—performing a current instance of the digital procedure—to input a set of manufacturing inputs corresponding to a particular instruction of the digital procedure; and serve this prompt to the operator, such as to a mobile device (e.g., tablet, AR/VR headset, mobile device, wearable device) associated with the operator during performance of the particular instruction. The mobile device can then: receive the set of manufacturing inputs by the operator, such as at an operator portal displayed at the mobile device; transmit the received set of manufacturing inputs to the computer system; and, at the computer system, store the set of manufacturing inputs as a set of non-visual features in a generated instruction profile for the performed instance of the particular instruction.

In one implementation, the computer system can: correlate a first equipment input, in the set of manufacturing inputs, with an equipment unit located at the first facility; correlate a first action input, in the set of manufacturing inputs, with an action prompt related to the equipment unit; and correlate an environmental input, in the set of manufacturing inputs, with a location in a facility map representing the first facility and containing the first equipment unit. The computer system can, via the operator device: record an equipment parameter corresponding to the equipment unit; record an action parameter corresponding to the action prompt; and record a location parameter corresponding to first location at the first facility. Accordingly, the computer system can then interpret the process change based on deviations between: the equipment parameter and a target equipment parameter in the target set of parameters; the action parameter and a target action parameter in the set of target parameters; and the location parameter and a target location parameter in the set of target parameters.

Alternatively, the computer system can: receive a handwritten record (e.g., accessing a scanned document) containing the set of manufacturing inputs generated by the operator during performance of the particular instruction; and autonomously extract the set of manufacturing inputs specified in the handwritten record to form the set of non-visual manufacturing features. The computer system can then: link subsets of non-visual features to the set of visual features extracted from the instruction video feed; and store these linked features in the instruction profile representing performance of the digital procedure. This ability to scan, input, or upload paper batch records into the computer system can be utilized to bring historical batch data, process parameters, batch yields and quality measurements into the statistical process control model for building a sufficiently large data set for a more complete analysis for determining the key process parameters for producing a golden batch configuration.

For example, the computer system can: extract a set of visual features from the instruction video feed depicting performance of a particular instruction by an operator; identify presence of the operator and a first equipment unit (e.g., centrifuge machine) in the instruction video feed associated with performance of the particular instruction by the operator; identify a first subset of non-visual features—in the set of non-visual features—corresponding to manufacturing inputs associated with the first equipment unit (e.g., centrifuge rotation speed, model number); link this first subset of non-visual features to the first equipment unit identified in the instruction video feed; and store this linked subset of non-visual features and the first equipment unit in the instruction profile generated for the digital procedure.

Therefore, the computer system can: track changes in manufacturing inputs over multiple performed instances of digital procedures within the facility; and isolate particular visual features and particular non-visual features predicted to produce process changes in batch yield output from a target batch yield output.

2.2.2.2 Parameters

In one implementation, the computer system can implement artificial intelligence techniques (e.g., regression, machine learning, deep learning, natural language processing) to: correlate manufacturing inputs specified in the verified instructional block to corresponding manufacturing inputs (e.g., equipment units, operator profiles, environments) available to the operator during performance of the verified instructional block; access an instruction video feed from an optical sensor proximal the operator within the facility during performance of the verified instructional block; and record parameters in the instruction profile corresponding to the manufacturing inputs based on visual features extracted from the instruction video feed.

For example, the computer system can: correlate an equipment input, in the first set of manufacturing inputs, with a first equipment unit located at the first facility; correlate an action input, in the first set of manufacturing inputs, with a first action prompt related to the first equipment unit; and correlate an environmental input, in the first set of manufacturing inputs, with a first location in a facility map representing the first facility and containing the first equipment unit. The computer system can then: access an instruction video feed from an optical sensor proximal the first location during performance of the first instance of the first verified instructional block by the operator; extract a first set of visual features from the instruction video feed; and identify, based on the first set of visual features, an equipment parameter corresponding to the first equipment unit; an action parameter corresponding to the action prompt; and an environmental parameter corresponding to the first location.

Accordingly, the computer system can: link the equipment parameter to the first equipment input; link the action parameter to the action input; link the environmental parameter to the environmental input; and store the instruction video feed as the first instruction profile representing the first instance of the first verified instructional block.

In another example, the equipment unit located within the first facility corresponds to a non-networked device located within the first facility. Accordingly, the computer system can: detect the first equipment unit within a field of view of the optical sensor based on the first set of visual features; and extract the equipment parameter from the instruction video feed corresponding to a particular value presented at the first equipment unit.

Therefore, the computer system can: record parameters corresponding to required manufacturing inputs specified in the verified instructional block of the digital procedure during performance of the digital procedure by the operator; and link the recorded parameters to the set of manufacturing inputs to generate an instruction profile uniquely characteristic of a performed instance of a digital procedure 2.3.3 Generating Target Instruction Profile In one implementation, the computer system can: generate a target instruction profile for instructional blocks of a digital procedure representing ideal performance of these instructional blocks; populate instructional blocks of the digital procedure with a target instruction profile for each instructional block in the digital procedure. In particular, the computer system can: retrieve a first instruction for each instructional block of a digital procedure in a video format corresponding to a high degree of guidance for performing the first instruction (e.g., a supervising operator performing the first instruction); extract a set of target instruction features from the video format of the first instruction; generate a target instruction profile based on the set of target instruction features representing ideal performance of the first instruction, such as target time duration, target object presence, target object path, target values from equipment units; and populate each instructional block for the digital procedure with the target instruction profile. Furthermore, the computer system can: receive a set of target non-visual features representing manufacturing inputs performed by the supervising operator for the first instruction; link these non-visual features to the set of target instruction features extracted from the instruction video feed; and store these target non-visual features in the digital procedure.

Therefore, the computer system can: generate target instruction profiles for instructional blocks of a digital procedure; and, during performance of an instance of the digital procedure, identify process changes from a current instruction profile to the target instruction profile; and automatically modify the instructional block in response to identifying these process changes.

2.4 Process Change Interpretation

Blocks of the method S200 recite: identifying a first batch yield of the first instance of the first verified instructional block as corresponding to a target batch range in the set of batch ranges in Block S240; interpreting a process change resulting in the first batch yield based on the first set of parameters of the first instruction profile and a target set of parameters of the first verified instructional block in Block S250; and isolating a first parameter, in the set of parameters, associated with the process change in Block S252.

In one implementation, the computer system can: responsive to completion of a digital procedure in the facility, generate a prompt for a remote operator to identify a process change for a performed instance of a digital procedure; serve this prompt to a remote operator (e.g., supervising operator) for review, such as to a remote viewing portal at a mobile device associated with the remote operator; and serve an instruction video feed associated with the performed instance of the digital procedure to the remote operator for review. During a review period of the instruction profile and the instruction video feed by the remote operator, the computer system can then: receive selection of a particular frame in the instruction video feed depicting an operator performing the digital procedure; receive selection of a particular label associated with the particular frame selected by the remote operator indicating a process change event in the digital procedure; and flag the performed instance of the digital procedure as a process change from ideal performance of the digital procedure.

For example: In a cell culture process using a bioreactor, extractables and leachables from different batch lots of plastic materials, such as the film type used in the bioreactor single-use bag, the single-use tubing, and other product contact materials, can have a significant impact on the process and the results of attempting to analyze the target conditions for a golden batch.

Extractables and leachables refer to substances that can migrate from the plastic materials into the cell culture media during the cell culture process. These substances can have a toxic effect on the cells being cultured and can also alter the chemical composition of the media, potentially affecting the growth, viability, and yields of the cells.

When different batch lots of plastic materials are used, the extractables and leachables types and concentrations can vary between batches of the consumables used, leading to different effects on the cells being cultured and the media. This can result in variability in the growth and viability of the cells, as well as variability in the product quality.

To minimize the impact of extractables and leachables on the cell culture process and the results of analyzing the target conditions for a golden batch, it is important to use consistent batches or lots of plastic materials and to thoroughly test the extractables and leachables of each batch lot before use. This can help to ensure that the process is consistent and that the results of the golden batch analysis are not impacted by variability in the plastic materials used.

Additionally, it is important to monitor the cell culture process closely and to track any changes in the growth and viability of the cells, as well as any changes in the chemical composition of the media, to ensure that the process remains under control and that the product quality is consistent. This can help to identify any issues related to extractables and leachables from the plastic materials and to take corrective action as necessary.

The computer system can use analyze a video feed to automatically scan a consumable product part number and lot or batch number from a product being used in the manufacturing process. Alternatively, the relevant product and lot number information can be manually scanned into the system using a camera, barcode scanner, RFID, or other entry method or it can be entered manually by the operator executing the block steps from the procedure to install the consumable. The computer system can keep track of the target batch yields, product quality, and release testing results to determine the best consumable product lot numbers (product contact plastic materials such as the single-use bioreactor film material) that result in the target yields for the manufacturing process. The computer system can inform other sites of the target batch yields when using this particular lot or batch of materials.

The computer system can additionally instruct the materials management system to order more of a particular lot or batch number of consumable product or film materials to store for usage in future batches if it is shown as a key process parameter for golden batches. This product lot number information can be provided into an exportable packaged document so an analysis can be performed on this particular lot number of material to help determine why this particular batch or lot of material is resulting in an increased yield and to ensure future deliveries of a product can meet these new product specifications to result in further golden batches being manufactured with further increases in batch yields.

In an alternate example an operator receives an instructional video feed corresponding to an instructional block for a process being performed. In this scenario the operator changes the process parameters for the bioreactor agitator and the aeration of the vessel to the maximum values for a cell culture process, which are within the operational specifications from the instructional blocks.

If these process changes result in a golden batch where the processing shows an increased batch yield for the product produced, the product quality, or release specification test results, then this can result in a cascade of activities to automatically change the instructional blocks in the procedures performed for all sites. This can include the automatic updating of the instructional video feeds to include the new specifications for the agitator and aeration flow rates to enter into the system. This can also include a re-examination of the specification ranges and if additional testing is needed to adjust the specification ranges to determine what the target parameter values can be to result in consistent golden batches in a manufacturing process. It is possible that during the initial scale-up process transfer that a more conservative approach was taken and that the specification ranges allowed to be used within the system need to be re-examined with the larger scale equipment. It is also possible that multiple factors are required to be simultaneously implemented to result in the golden batch improvements of yields and that these factors working together were not recognized previously.

Therefore, the computer system can: queue a set of instruction video feeds corresponding to performed instances of a digital procedure that produced a batch yield output with a process change from a target batch yield output; and flag subsets of the instruction video feed with a process change event identified by a supervising operator overseeing performance of the digital procedure in the facility.

2.4.1 Autonomous Process Change Interpretation

In one implementation, the computer system can: in response to completion of a particular instructional block of a digital procedure by an operator, generate an instruction profile representing performance of the particular instructional block by the operator; extract a target instruction profile from the digital procedure representing ideal performance of the particular instructional block in the digital procedure; interpret a process change (e.g., deviation)—exceeding a threshold process change—between the generated instruction profile and the target instruction profile; and isolate a particular non-visual manufacturing feature in the instruction profile based on the interpreted process change and predicted to produce the process change in the performed instance of the particular instructional block.

For example, the computer system can: interpret a process change in a particular operator action (e.g., mixing speed) performed by the operator in the instruction profile that is a process change from a target operator action in the target instruction profile; isolate an operator profile associated with the operator performing this particular action; and flag the operator profile for additional guidance during a subsequent instance of the digital procedure performed by the operator.

In another example, the computer system can: interpret a process change in an equipment unit model specified in the instruction profile to a target equipment unit model specified in the target instruction profile (e.g., operator is handling an outdated equipment unit model); isolate the equipment unit in the instruction profile, such as by extracting a frame in the instruction video feed depicting the equipment unit; and flag performed instances of the digital procedure including an instruction profile indicating that the operator handled the equipment unit.

In yet another example, the computer system can: interpret a process change in an environmental condition (e.g., temperature) in the instruction profile from a target environmental condition specified in the target instruction profile; isolate a manufacturing input (e.g., thermostat setting) linked to the environmental condition and producing the process change in the digital procedure; and flag the operator for text guidance for this particular instructional block during performance of subsequent digital procedure in the facility.

Therefore, the computer system can: autonomously detect process changes for performed instances of a digital procedure over a specified period of time (e.g., one week, 1 month) within the facility; and autonomously isolate modifiable manufacturing inputs for the digital procedure predicted to produce these process changes in order to recreate and/or avoid these process change events in future performed instances of the digital procedure within the facility.

2.4.2 Example: Equipment Process Change

In one example, the computer system can interpret a process change corresponding to equipment unit inputs in a verified instructional block based on deviations between target equipment unit parameters specified in the verified instructional block and recorded parameters in the instructional block profile. Specifically, the computer system can identify deviations between: environmental conditions (e.g., temperature) and target environmental conditions of the equipment unit input; a calibration status (e.g., currently calibrated) and a target calibration status of the equipment unit input; and/or a particular value presented at an equipment unit and a target value of the equipment unit input specified in the verified instructional block.

Accordingly, the computer system can: identify a deviation, exceeding a threshold deviation, between the equipment unit parameter and the target equipment unit parameter; isolate the equipment unit parameter as the parameter associated with the process change; and initialize the unverified draft instructional block characterizing the process change. In particular, the computer system can: detect the first equipment input in the unverified draft instructional block; and store the first equipment parameter, related to the first equipment input, as the target equipment parameter in the unverified draft instructional block.

Therefore, the computer system can: generate a draft instructional block characteristic of a process change that resulted in a target batch yield for a manufacturing process; and modify the existing digital procedure to include the draft instructional block in place of the verified instructional block for subsequent instances of the digital procedure performed at the facility. Thus, the computer system can modify subsequent instances of the digital procedure performed at the first facility in order to maintain a target batch yield for performed instances of the digital procedure at the first facility.

2.5 Modifying the Digital Procedure

Blocks of the Method S200 recite: initializing an unverified draft instructional block characterizing the process change based on the first verified instructional block and the first parameter in Block S260; and flagging the unverified draft instructional block for manual review by a reviewer overseeing digital procedures performed at the first facility in Block S270. Generally, the computer system can modify instructional blocks of a digital procedure in order to produce batch yields of performed instances of the digital procedure within the facility that fall within a golden batch range in the batch yield specification. In particular, the computer system can: initialize an alternative instructional block for a particular instructional block in the digital procedure containing a particular non-visual manufacturing input predicted to produce a batch yield output that falls within the golden batch range indicated in the batch yield specification; and modify the digital procedure to replace the particular instructional block with the alternative instructional block and implement this modified digital procedure for subsequent instances of the digital procedure performed within the facility Additionally or alternatively, the computer system can generate a new digital procedure containing the alternative instructional block and implement this new digital procedure for subsequent performed instances of the digital procedure performed within the facility.

2.5.1 Golden Batch Range

In one implementation, the system can: identify a particular batch yield for a performed instance of the digital procedure falling within the golden batch range specified in the batch yield specification; interpret a process change between an instruction profile for the performed instance of the digital procedure and a target instruction profile for the digital procedure; identify a particular non-visual feature in the set of non-visual features based on the process change corresponding to a manufacturing input for the digital procedure; and populate the alternative instructional block with the particular non-visual feature. Additionally or alternatively, the computer system can: query an instructional block library for an alternative instructional block containing the particular non-visual feature; and modify the digital procedure to replace the particular instructional block with the alternative instructional block identified in the instructional block library.

Thus, the computer system can: predict manufacturing inputs of a digital procedure that produce batch yield outputs that fall within the golden batch range of the batch yield specification; and autonomously modify instructional blocks (e.g., steps, sub-steps) of a digital procedure to include these predicted manufacturing inputs for subsequent performances of the digital procedure within the facility.

For example, the computer system can: identify a particular batch output of a performed instance of a particular instructional block—in the digital procedure—falling within the golden batch range specified in the batch yield specification; interpret a process change between an instruction profile for the performed instance of the particular instructional block and a target instruction profile corresponding to a process change in a centrifuge mixing speed (e.g., a particular mixing speed in the instruction profile is faster than an indicated mixing speed in the target instruction profile); isolate a particular manufacturing input corresponding to a mixing speed input for performing the particular instructional block and predicted to produce the batch yield output within the golden batch range; initialize an alternative instructional block for the particular instructional block containing the particular manufacturing input; and modify the digital procedure to replace the previously performed particular instructional block with the alternative instructional block.

In one implementation, the computer system can, in response to the operator initiating the first instance of the verified instructional block: capture an instruction video feed from an operator device, associated with the operator, during performance of the first instance of the first verified instructional block; and store the instruction video feed in the first instruction profile. Additionally, the computer system can then serve the unverified draft instructional block characterizing the process change and the first instruction profile including the instruction video feed to a reviewer device associated with the reviewer overseeing digital procedures performed at the first facility. The computer system can then, in response to receiving a verification selection from the reviewer device: store the unverified draft instructional block as a verified instructional block in an instructional block library containing a set of verified instructional blocks associated with approved digital procedures performed at the first facility; and insert the verified instructional block, in place of the first verified instructional block, in the first digital procedure, for subsequent instances of the first digital procedure at the first facility.

Therefore, the computer system can: repeat this process for subsequent performed instances of the digital procedure within the facility; and autonomously modify instructional blocks of the digital procedure in order to configure production of batch yields that fall within the golden batch range for performed digital procedures within the facility.

2.5.2 Out-of-Specification Batch Range+Warning Batch Range

In one implementation, the computer system can: identify a particular batch yield for a performed instance of the digital procedure falling within an out-of-specification batch range or a warning batch range specified in the batch yield specification; interpret a process change between an instruction profile for the performed instance of the digital procedure and a target instruction profile for the digital procedure; isolate a particular non-visual feature in the set of non-visual features based on the process change corresponding to a manufacturing input for the digital procedure and predicted to produce the particular batch yield; and flag the particular non-visual feature for review by a supervising operator overseeing performance of the digital procedure within the facility.

For example, the computer system can: record a set of parameters corresponding to the set of manufacturing inputs during performance of the instance of the verified instructional block by the operator; and link the set of parameters to the set of manufacturing inputs to generate an instruction profile representative of the instance of the verified instructional block performed by the operator. The computer system can then, following completion of the instance of the verified instructional block: identify a batch yield of the instance of the verified instructional block as exceeding a threshold deviation from the target batch range in the set of batch ranges; interpret a process change resulting in the batch yield based on the set of parameters of the instruction profile and the target set of parameters of the first verified instructional block; and isolate a parameter, in the set of parameters, associated with the second process change. Thus, the computer system can then flag the instruction profile, the parameter, and the verified instructional block for manual review by the reviewer overseeing digital procedures performed at the first facility.

In another example, the computer system can: as described above, correlate an equipment input, in the set of manufacturing inputs, with an equipment unit located at the first facility; and record an equipment parameter, in the set of parameters, corresponding to a particular value presented at the second equipment unit during performance of the verified instructional block by the operator. In this example, the computer system can then: interpret the process change in response to exceeding a threshold deviation between the particular value and a target value in the target set of parameters; and isolate the equipment parameter corresponding to the particular value.

In another example, the computer system can: initialize a draft instructional block based on the verified instructional block; identify a manufacturing input associated with the process change in the draft instructional block; and isolate a target parameter corresponding to the manufacturing input and analogous to the parameter in the draft instructional block. Accordingly, the computer system can: generate a prompt requesting a reviewer to modify parameters in the draft instructional block; serve the prompt and the draft instructional block to the reviewer device associated with the reviewer; receive a tolerance modification to the target parameter for the manufacturing input in the draft instructional block from the reviewer; and insert the draft instructional block, in place of the verified instructional block, in the digital procedure for subsequent instances of the digital procedure performed at the first facility. Therefore, the computer system can routinely modify parameters in the digital procedure performed at the facility to prevent batch yields corresponding to the out-of-specification batch range.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method for predicting batch yield for a manufacturing process comprising:

accessing a first digital procedure containing a first verified instructional block, in a sequence of instructional blocks, currently performed at a first facility;

accessing a batch range specification associated with the first verified instructional block and defining a set of batch ranges for characterizing batch output upon completion of a performed instance of the first verified instructional block;

in response to an operator initiating a first instance of the first verified instructional block:

detecting a first set of manufacturing inputs in the first verified instructional block;

recording a first set of parameters corresponding to the first set of manufacturing inputs during performance of the first verified instructional block by the operator; and linking the first set of parameters to the first set of manufacturing inputs to generate a first instruction profile representative of the first instance of the first verified instructional block;

following completion of the first instance of the first verified instructional block by the operator:

identifying a first batch yield of the first instance of the first verified instructional block as corresponding to a target batch range in the set of batch ranges;

interpreting a process change resulting in the first batch yield based on the first set of parameters of the first instruction profile and a target set of parameters of the first verified instructional block; and isolating a first parameter, in the set of parameters, associated with the process change;

initializing an unverified draft instructional block characterizing the process change based on the first verified instructional block and the first parameter; and flagging the unverified draft instructional block for manual review by a reviewer overseeing digital procedures performed at the first facility.

2. The method of claim 1, wherein accessing the batch range specification comprises:

accessing a set of batch yield data corresponding to previously-performed instances of the first digital procedure within the first facility;

transforming the batch yield data into a batch map representing batch yield output from the batch yield data as a function of previously-performed instances of the first verified instructional block of the first digital procedure;

serving the batch map to a reviewer device associated with the reviewer overseeing performance of the first digital procedure at the first facility;

receiving a set of labels for the batch map corresponding to the set of batch ranges from the reviewer device, the set of labels comprising:

a standard batch range representing a tolerable batch yield quantity for previously-performed instances of the first verified instructional block;

the target batch range, within the standard batch range, representing a target batch yield quantity for previously-performed instances of the first verified instructional block; and an out-of-specification range, different from the standard batch range, representing intolerable batch yield quantity for previously-performed instances of the first verified instructional block; and storing the batch map comprising the set of labels as the batch range specification corresponding to the first verified instructional block of the first digital procedure.

3. The method of claim 1:

further comprising:

correlating a first equipment input, in the first set of manufacturing inputs, with a first equipment unit located at the first facility;

correlating a first action input, in the first set of manufacturing inputs, with a first action prompt related to the first equipment unit; and correlating a first environmental input, in the first set of manufacturing inputs, with a first location in a facility map representing the first facility and containing the first equipment unit;

wherein recording the first set of parameters corresponding to the first set of manufacturing inputs comprises:

recording an equipment parameter corresponding to the first equipment unit;

recording an action parameter corresponding to the first action prompt; and recording a location parameter corresponding to the first location at the first facility; and wherein interpreting the process change comprises interpreting the process change based on deviations between:

the equipment parameter and a target equipment parameter in the target set of parameters;

the action parameter and a target action parameter in the set of target parameters; and the location parameter and a target location parameter in the set of target parameters.

4. The method of claim 3:

wherein isolating the first parameter comprises identifying a deviation, exceeding a threshold deviation, between the first equipment parameter and the target equipment parameter; and wherein initializing the unverified draft instructional block characterizing the process change comprises:

detecting the first equipment input in the unverified draft instructional block; and storing the first equipment parameter, related to the first equipment input, as the target equipment parameter in the unverified draft instructional block.

5. The method of claim 3, wherein recording the first set of parameters corresponding to the first set of manufacturing inputs comprises:

initializing a capture block defining a set of input fields corresponding to the first set of manufacturing inputs;

generating a prompt requesting the operator to populate the set of input fields in the capture block;

serving the prompt and the capture block to an operator device associated with the operator;

receiving a particular value presented at the first equipment unit from the operator;

recording the particular value in a first input field, in the set of input fields, as the equipment parameter corresponding to the first equipment input;

receiving a guidance specification corresponding to the action prompt from the operator;

recording the guidance specification in a second input field, in the set of input fields, as the action parameter corresponding to the first action input;

receiving a temperature value corresponding to the first location from the operator; and recording the temperature value in a third input field, in the set of input fields, as the location parameter corresponding to the first environmental input.

6. The method of claim 1, further comprising:

accessing an instructional block library containing a set of verified instructional blocks associated with approved digital procedures performed at the first facility;

identifying a second verified instructional block, in the set of verified instructional blocks, as analogous to the first unverified draft instructional block in response to the second verified instructional block comprising manufacturing inputs associated with the first set of manufacturing inputs and the first parameter; and inserting the second verified instructional block, in place of the first verified instructional block, in the first digital procedure for subsequent instances of the first digital procedure performed at the first facility.

7. The method of claim 1:

further comprising:

correlating an equipment input, in the first set of manufacturing inputs, with a first equipment unit located at the first facility;

correlating an action input, in the first set of manufacturing inputs, with a first action prompt related to the first equipment unit; and correlating an environmental input, in the first set of manufacturing inputs, with a first location in a facility map representing the first facility and containing the first equipment unit;

wherein recording the first set of parameters corresponding to the first set of manufacturing inputs comprises:

accessing an instruction video feed from an optical sensor proximal the first location during performance of the first instance of the first verified instructional block by the operator;

extracting a first set of visual features from the instruction video feed; and identifying the first set of parameters based on the first set of visual features, the first set of parameters comprising:

an equipment parameter corresponding to the first equipment unit;

an action parameter corresponding to the action prompt; and an environmental parameter corresponding to the first location; and wherein linking the set of parameters to the first set of manufacturing inputs to generate the first instruction profile comprises:

linking the equipment parameter to the first equipment input;

linking the action parameter to the action input;

linking the environmental parameter to the environmental input; and storing the instruction video feed as the first instruction profile representing the first instance of the first verified instructional block.

8. The method of claim 7, wherein identifying the first set of parameters comprises:

detecting the first equipment unit within a field of view of the optical sensor based on the first set of visual features, the first equipment unit corresponding to a non-networked device located at the first facility; and extracting the equipment parameter from the instruction video feed corresponding to particular value presented at the first equipment unit.

9. The method of claim 1:

further comprising, in response to the operator initiating the first instance of the first verified instructional block:

capturing an instruction video feed from an operator device, associated with the operator, during performance of the first instance of the first verified instructional block; and storing the instruction video feed in the first instruction profile;

wherein flagging the unverified draft instructional block for manual review comprises serving to a reviewer device associated with the reviewer overseeing digital procedures performed at the first facility:

the unverified draft instructional block characterizing the process change; and the first instruction profile comprising the instruction video feed; and further comprising, in response to receiving a verification selection from the reviewer device:

storing the unverified draft instructional block as a verified instructional block in an instructional block library containing a set of verified instructional blocks associated with approved digital procedures performed at the first facility; and inserting the verified instructional block, in place of the first verified instructional block, in the first digital procedure, for subsequent instances of the first digital procedure at the first facility.

10. The method of claim 1, further comprising:

initializing new digital procedure based on the first digital procedure and comprising the first unverified draft instructional block, in place of the first verified instructional block, in the first digital procedure;

receiving selection to transfer the new digital procedure for staging at a second facility within a corpus of manufacturing facilities;

accessing an instructional block library containing a set of verified instructional blocks associated with approved digital procedures performed at the second facility;

detecting a second set of manufacturing inputs in the first unverified draft instructional block;

identifying a second verified instructional block, in the set of verified instructional blocks contained in the instructional block library, as analogous to the first unverified draft instructional block in response to the second verified instructional block comprising the second set of manufacturing inputs;

calculating a transfer score for staging the first unverified draft instructional block at the second facility based on:

a second target set of parameters for the second set of manufacturing inputs in the first unverified draft instructional block; and a second set of parameters for the second set of manufacturing inputs in the second verified instructional block; and in response to the transfer score exceeding a threshold transfer score, inserting the second verified instructional block, in place of the first unverified draft instructional block, in the new digital procedure.

11. The method of claim 10, wherein identifying the second verified instructional block, in the set of verified instructional blocks contained in the instructional block library, as analogous to the first unverified draft instructional block comprises:

correlating an equipment input, in the second set of manufacturing inputs, with an equipment unit located at the second facility;

correlating an action input, in the second set of manufacturing inputs, with an action prompt related to equipment unit;

correlating an operator guidance input, in the second set of manufacturing inputs, with an operator profile associated with an operator at the second facility approved to interface with the equipment unit; and identifying the second verified instructional block as analogous to the first unverified draft instructional block in response to the second verified instructional block comprising manufacturing inputs associated with the equipment unit, the action prompt, and the operator profile.

12. The method of claim 10, wherein calculating the transfer score comprises:

detecting an equipment input, in the second set of manufacturing inputs, corresponding to an equipment unit located at the second facility;

identifying, in the second set of parameters from the second verified instructional block:

an operating status representing an operating condition of the equipment unit;

a model type for the equipment unit; and a calibration status representing a calibration condition of the first equipment unit;

identifying a target operating status, a target model type, and a target calibration status, in the second target set of parameters corresponding to the equipment input from the first unverified draft instructional block; and calculating the first transfer score as exceeding the threshold transfer score in response to approximating the operating status to the target operating status, the model type to the target model type, and the calibration status to the target calibration status.

13. The method of claim 1, further comprising:

in response to the operator initiating a second instance, following the first instance, of the first verified instructional block, recording a second set of parameters corresponding to the first set of manufacturing inputs during performance of the second instance of the first verified instructional block;

linking the second set of parameters to the first set of manufacturing inputs to generate a second instruction profile representative of the second instance of the first verified instructional block;

following completion of the second instance of the first verified instructional block:

identifying a second batch yield of the second instance of the first verified instructional block as exceeding a threshold deviation from the target batch range in the set of batch ranges;

interpreting a second process change resulting in the second batch yield based on the second set of parameters of the second instruction profile and the target set of parameters of the first verified instructional block; and isolating a second parameter, in the second set of parameters, associated with the second process change; and flagging the second instruction profile, the second parameter, and the first verified instructional block for manual review.

14. The method of claim 13:

further comprising correlating a second equipment input, in the second set of manufacturing inputs, with a second equipment unit located at the first facility;

wherein recording the second set of parameters comprises recording an equipment parameter, in the second set of parameters, corresponding to a particular value presented at the second equipment unit;

wherein interpreting the process change comprises, interpreting the process change in response to exceeding a threshold deviation between the particular value and a target value in the target set of parameters; and wherein isolating the second parameter comprises, isolating the equipment parameter corresponding to the particular value.

15. The method of claim 13, further comprising, at a reviewer device associated with the reviewer:

initializing a draft instructional block based on the first verified instructional block;

identifying a manufacturing input associated with the process change in the draft instructional block;

isolating a target parameter corresponding to the manufacturing input and analogous to the second parameter in the draft instructional block;

receiving a tolerance modification to the target parameter for the manufacturing input in the draft instructional block from the reviewer; and inserting the draft instructional block, in place of the first verified instructional block, in the first digital procedure for subsequent instances of the first digital procedure performed at the first facility.

16. A method for predicting batch yield for a manufacturing process comprising:

accessing protocol record from a record database containing a set of protocol records corresponding to previously-performed instances of a digital procedure at a first facility;

accessing a batch range specification associated with the digital procedure and defining a set of batch ranges for characterizing batch output upon completion of a performed instance of the digital procedure;

detecting a first set of manufacturing inputs in a sequence of instructional blocks contained in the digital procedure;

linking a first set of parameters in the record corresponding to the first set of manufacturing inputs;

identifying, in the record, a batch yield of the digital procedure as exceeding a threshold deviation from a target batch range in the set of batch ranges;

interpreting a process change resulting in the batch yield based on the first set of parameters in the record and a target set of parameters specified in the digital procedure;

isolating a first parameter, in the first set of parameters in the record, associated with the process change, the first parameter exceeding a threshold deviation from a target parameter in the target set of parameters; and flagging the record for manual review by a reviewer overseeing digital procedures performed at the first facility.

17. The method of claim 16:

further comprising correlating an equipment input, in the first set of manufacturing inputs, with a particular equipment unit located at the first facility;

wherein linking the first set of parameters comprises linking an equipment parameter, in the first set of parameters, to a particular value presented at the particular equipment unit;

wherein interpreting the process change comprises interpreting the process change in response to exceeding a threshold deviation between the particular value and a target value in the target set of parameters; and wherein isolating the first parameter comprises isolating the equipment parameter corresponding to the particular value.

18. The method of claim 16, further comprising at a reviewer device associated with the reviewer:

initializing a new digital procedure based on the digital procedure;

identifying a manufacturing input associated with the process change in the new digital procedure;

isolating a target parameter corresponding to the manufacturing input and analogous to the first parameter in the new digital procedure;

receiving a tolerance modification to the target parameter for the manufacturing input from the reviewer; and initializing the new digital procedure, in place of the digital procedure, for subsequent instances of the digital procedure performed at the first facility.

19. The method of claim 16, wherein accessing the batch yield specification comprises:

accessing a set of batch yield data corresponding to previously-performed instances of the digital procedure within the first facility;

transforming the batch yield data into a batch map representing batch yield output from the batch yield data as a function of previously performed instances of the digital procedure;

serving the batch map to a reviewer device associated with the reviewer overseeing performance of the digital procedure at the first facility;

receiving a set of labels for the batch map corresponding to the set of batch ranges from the reviewer device, the set of labels comprising:

a standard batch range representing a tolerable batch yield quantity for previously-performed instances of the digital procedure;

the target batch range, within the standard batch range, representing a target batch yield quantity for previously-performed instances of the digital procedure; and an out-of-specification range, different from the standard batch range, representing intolerable batch yield quantity for previously-performed instances of the first digital procedure; and storing the batch map comprising the set of labels as the batch range specification corresponding to the first digital procedure.

20. A method for predicting batch yield for a manufacturing process comprising:

accessing a batch range specification:

associated with a verified digital procedure currently performed at a facility; and defining a set of batch ranges for characterizing batch output upon completion of a performed instance of the verified digital procedure;

in response to an operator initiating an instance of the verified digital procedure:

detecting a set of manufacturing inputs in the verified digital procedure; and receiving a set of parameters corresponding to the set of manufacturing inputs during performance of the verified digital procedure by the operator;

identifying a batch yield of the instance of the verified digital procedure as corresponding to a target batch range in the set of batch ranges;

interpreting a process change resulting in the batch yield based on the set of parameters and a target set of parameters;

isolating a parameter, in the set of parameters, associated with the process change; and initializing a new digital procedure characterizing the process change based on the verified digital procedure and the parameter.

* * * * *